US012200532B2

(12) United States Patent
Luo et al.

(10) Patent No.: US 12,200,532 B2
(45) Date of Patent: Jan. 14, 2025

(54) DELAY BOUNDS IN INTEGRATED ACCESS AND BACKHAUL NETWORK

(71) Applicant: QUALCOMM Incorporated, San Diego, CA (US)

(72) Inventors: Jianghong Luo, Skillman, NJ (US); Karl Georg Hampel, Hoboken, NJ (US); Navid Abedini, Basking Ridge, NJ (US); Naeem Akl, Somerville, NJ (US); Tao Luo, San Diego, CA (US); Luca Blessent, Whitehouse Station, NJ (US); Junyi Li, Fairless Hills, PA (US); Luis Fernando Brisson Lopes, Swindon (GB)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/382,303

(22) Filed: Jul. 21, 2021

(65) Prior Publication Data

US 2022/0070718 A1    Mar. 3, 2022

Related U.S. Application Data

(60) Provisional application No. 63/072,764, filed on Aug. 31, 2020.

(51) Int. Cl.
*H04W 76/12*    (2018.01)
*H04W 28/02*    (2009.01)
(Continued)

(52) U.S. Cl.
CPC ....... *H04W 28/0236* (2013.01); *H04W 40/12* (2013.01); *H04W 76/12* (2018.02); *H04W 92/24* (2013.01)

(58) Field of Classification Search
CPC ............. H04W 28/0236; H04W 40/12; H04W 76/12; H04W 92/24; H04W 28/0268; H04W 40/02
See application file for complete search history.

(56) References Cited

U.S. PATENT DOCUMENTS

| 2015/0029846 | A1 | 1/2015 | Liou et al. |
| 2020/0153559 | A1* | 5/2020 | Cheng .................. H04L 5/0053 |

(Continued)

FOREIGN PATENT DOCUMENTS

| EP | 3927019 A1 * | 12/2021 | ............. H04L 69/22 |
| WO | WO-2019240657 A1 * | 12/2019 | ........ H04W 28/0268 |

(Continued)

OTHER PUBLICATIONS

Huawei (Remaining issues for BH RLC channel management, 3GPP Draft; RS-200754, 3rd Generation Partnership Project (3GPP), Feb. 2020).*

(Continued)

*Primary Examiner* — Lakeram Jangbahadur
(74) *Attorney, Agent, or Firm* — Procopio, Cory, Hargreaves & Savitch LLP

(57) ABSTRACT

A method, a computer-readable medium, and an apparatus are provided for wireless communication at an integrated access and backhaul (IAB) node. The IAB node receives one or more delay parameters from an IAB donor and determines an access PDB over an air link between the IAB node and a child node or a UE based in part on the one or more delay parameters received from the IAB donor.

27 Claims, 17 Drawing Sheets

(51) Int. Cl.
*H04W 40/12* (2009.01)
*H04W 92/24* (2009.01)

(56) References Cited

U.S. PATENT DOCUMENTS

| | | | | |
|---|---|---|---|---|
| 2020/0187040 | A1* | 6/2020 | Tsai | H04W 24/10 |
| 2022/0038381 | A1* | 2/2022 | Lohr | H04W 8/04 |
| 2023/0189045 | A1* | 6/2023 | Chen | H04W 24/08 370/252 |

FOREIGN PATENT DOCUMENTS

| | | | | |
|---|---|---|---|---|
| WO | WO-2020029196 A1 * | 2/2020 | | H04W 28/0252 |
| WO | WO-2020164596 A1 * | 8/2020 | | H04L 67/61 |

OTHER PUBLICATIONS

Huawei: "Remaining Issues for BH RLC Channel Management", 3GPP Draft, 3GPP TSG-RAN WG3 Meeting #107-e, R3-200754, 3rd Generation Partnership Project (3GPP), vol. RAN WG3, No. E-meeting, Feb. 24, 2020-Mar. 6, 2020, Feb. 14, 2020 (Feb. 14, 2020), XP051854198, 6 Pages, Retrieved from the Internet: URL: https://ftp.3gpp.org/tsg_ran/WG3_lu/TSGR3_107_e/Docs/R3-200754.zip. R3-200754 (TP for NR_IAB BL CR for TS 38.473) Remaining Issues for BH \RI_doc. [Retrieved on Feb. 14, 2020] Figure 2, p. 2, Line 11-Line 16 p. 2, Line 25-Line 27.

International Search Report and Written Opinion—PCT/US2021/042794—ISA/EPO—Dec. 1, 2021.

Nokia, et al., "QoS Impacts in IAB System", 3GPP Draft, 3GPP TSG-RAN WG3 NR AdHoc 1807, R3-183752, QOS Impacts of IAB, 3rd Generation Partnership Project (3GPP), Mobile Competence Centre, 650, Route Des Lucioles, F-06921 Sophia-Antipolis Cedex, France, vol. RAN WG3, No. Montreal, Canada, Jul. 2, 2018-Jul. 6, 2018, Jul. 1, 2018 (Jul. 1, 2018), XP051468037, 4 Pages, Retrieved from the Internet: URL: http://www.3gpp.org/ftp/Meetings%5F3GPP%5FSYNC/RAN3/Docs. [Retrieved on Jul. 1, 2018], Paragraph [0003], Figure 1.

Zte, et al., "Consideration on Multi-Hop Latency for IAB Network", 3GPP Draft, 3GPP TSG-RAN WG3 #109-e, R3-205168, 3rd Generation Partnership Project (3GPP), vol. RAN WG3, No. Online, Aug. 17, 2020-Aug. 28, 2020, Aug. 7, 2020 (Aug. 7, 2020), XP051915868, 9 Pages, Retrieved from the Internet: URL: https://ftp.3gpp.org/tsg_ran/WG3_lu/TSGR3_109-e/Docs/R3-205168.zip. R3-205168 Consideration on Multi-Hop Latency for IAB Network. doc. [Retrieved on Aug. 7, 2020] Paragraph [2.1.1], figures 1, 2.

* cited by examiner

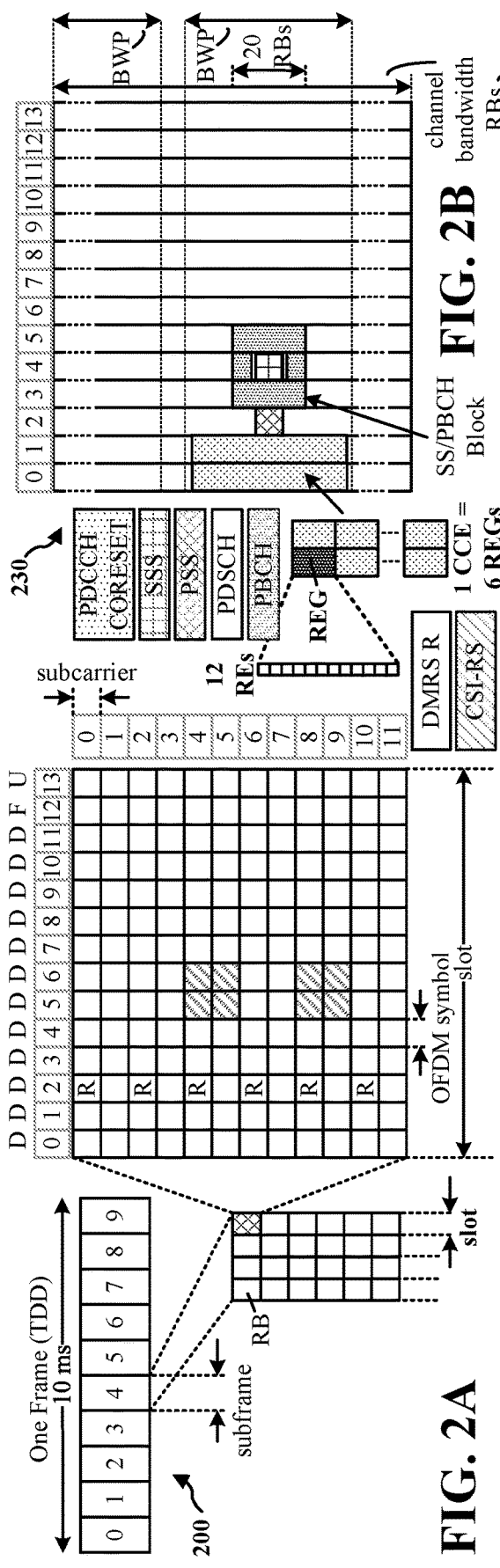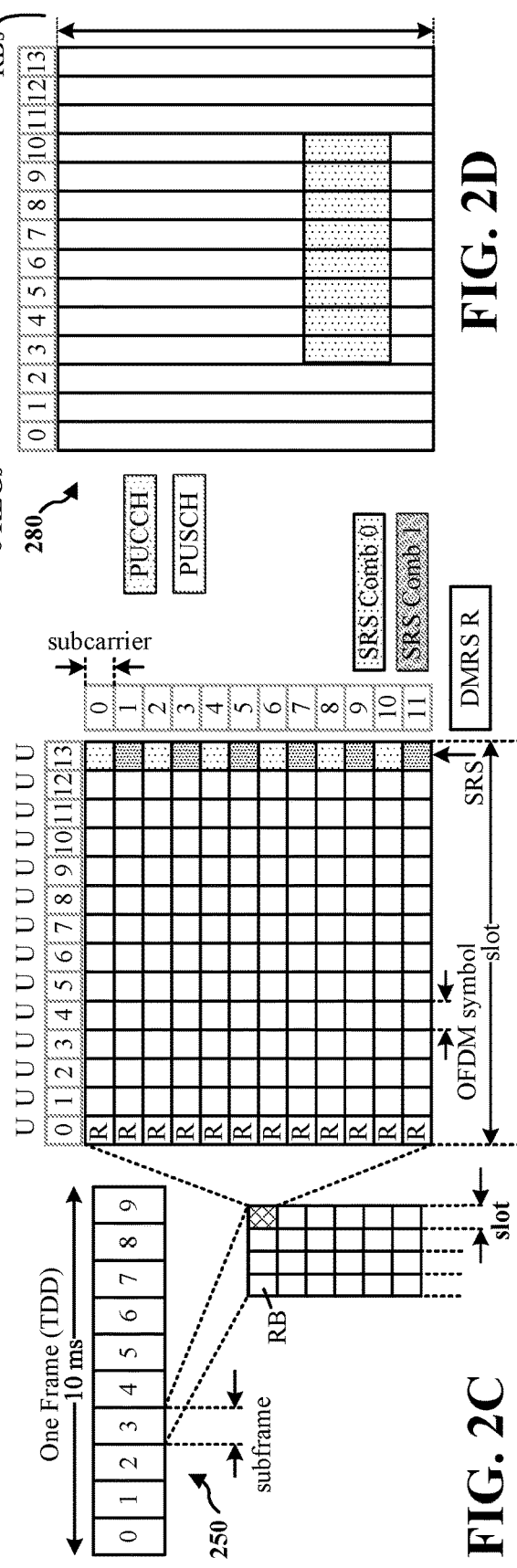

DELAY BOUNDS IN INTEGRATED ACCESS AND BACKHAUL NETWORK

CROSS REFERENCE TO RELATED APPLICATION(S)

This application claims the benefit of and priority to U.S. Provisional Application Ser. No. 63/072,764, entitled "DELAY BOUNDS IN INTEGRATED ACCESS AND BACKHAUL NETWORK" and filed on Aug. 31, 2020, which is expressly incorporated by reference herein in its entirety.

TECHNICAL FIELD

The present disclosure relates generally to communication systems, and more particularly, to wireless communication including an integrated access and backhaul (IAB) networks.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication at an IAB node. The IAB node apparatus may receive one or more delay parameters from an IAB donor and determine an access packet delay budget (PDB) over an air link between the IAB node and a child node or a user equipment (UE) based in part on the one or more delay parameters received from the IAB donor.

In another aspect of the disclosure, a method, a computer-readable medium, and an apparatus are provided for wireless communication for a central unit (CU) of an IAB network. The apparatus may indicate one or more delay parameters to an IAB node for determination of an access PDB over an air link between the IAB node and a child node or a UE associated with a data packet and send the packet for transmission to the child node via the IAB node, the packet having the access PDB indicated based on the one or more delay parameters.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
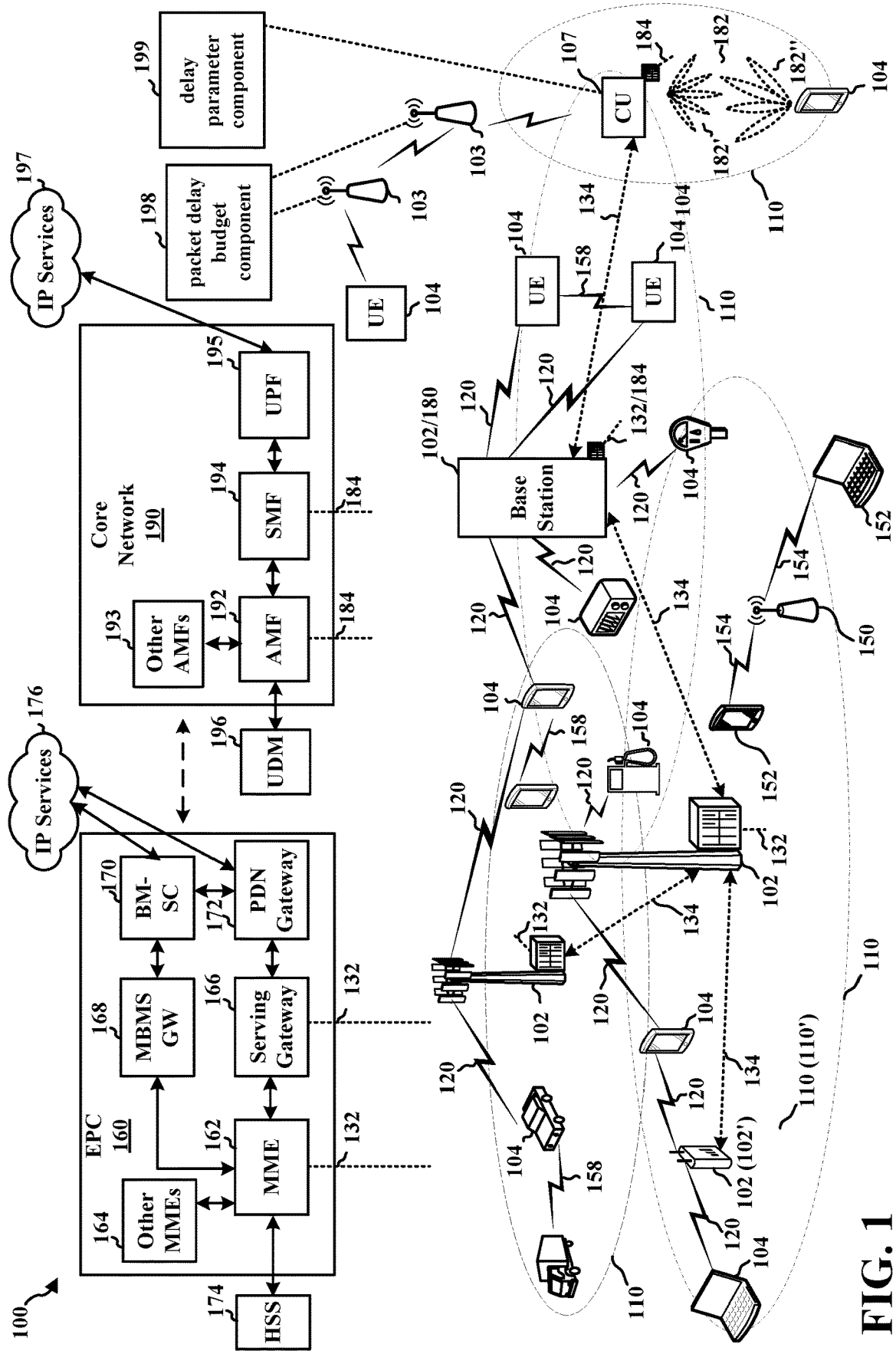
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field-programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer-executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for the implementation and practice of claimed and described aspects. For example, transmission and reception of wireless signals necessarily include a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (e.g., a low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase the capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the IAB node 103 may include a packet delay budget component 198 configured to receive at least one delay parameter from a CU of an IAB donor of the IAB network, and determine an access PDB over an air link between the IAB node and a child node based on at least in part on the at least one delay parameter received from the CU of the IAB donor. A central unit (CU) 107 of an IAB network may include a delay parameter component 199 configured to indicate one or more delay parameters to an IAB node for determination of an access PDB over an air link between the IAB node and a child node or a UE associated with a data packet and send the packet for transmission to the child node via the IAB node, the packet having the access PDB indicated based on the one or more delay parameters. The CU may send the packet for transmission to a UE 104 via one or more IAB nodes 103 including the IAB node. Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS Δf = $2^\mu \cdot 15$[KHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where y is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
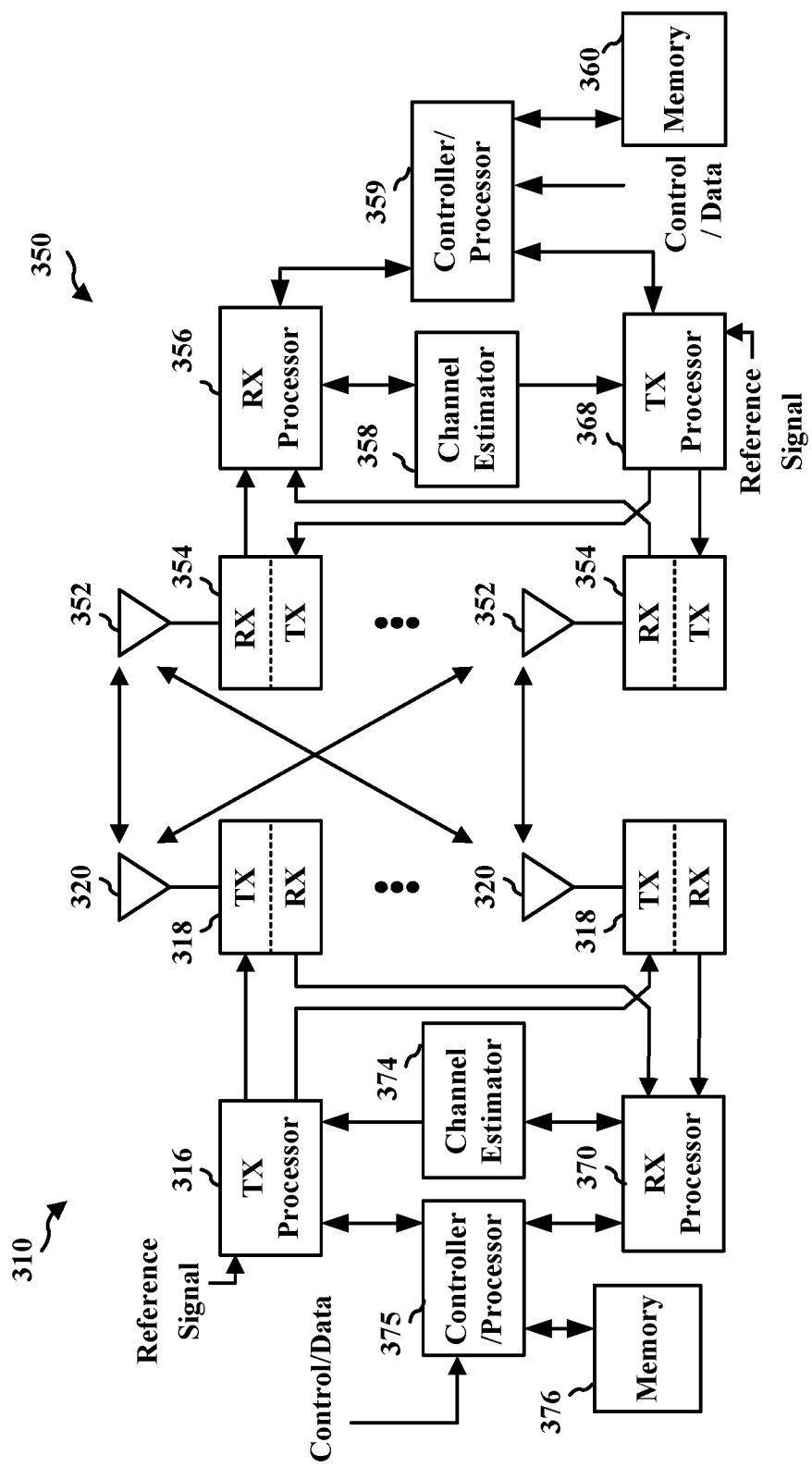
FIG. 3 is a diagram illustrating an example of a base station and user equipment (UE) in an access network.

FIG. 3 is a block diagram of a wireless device 310 in communication with a wireless device 350 in an access network. In one aspect, the device 310 may be an IAB donor and the device 350 may be an IAB node. In another aspect, the device 310 may be a parent IAB node and the device 350 may be a child IAB node. In another aspect, the device 310 may be a parent IAB node and the device 350 may be a UE. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318 TX. Each transmitter 318 TX may modulate a radio frequency (RF) carrier with a respective spatial stream for transmission.

At the device 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the device 310. These soft decisions may be based on channel estimates computed by the channel estimator 358. The soft decisions are then decoded and deinterleaved to recover the data and control signals that were originally transmitted by the device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the device 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the device 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the packet delay budget component 198 of FIG. 1. At least one of the TX processor 316, the RX processor 370, and the controller/processor 375 may be configured to perform aspects in connection with the delay parameter component 199 of FIG. 1.

Figure 4:
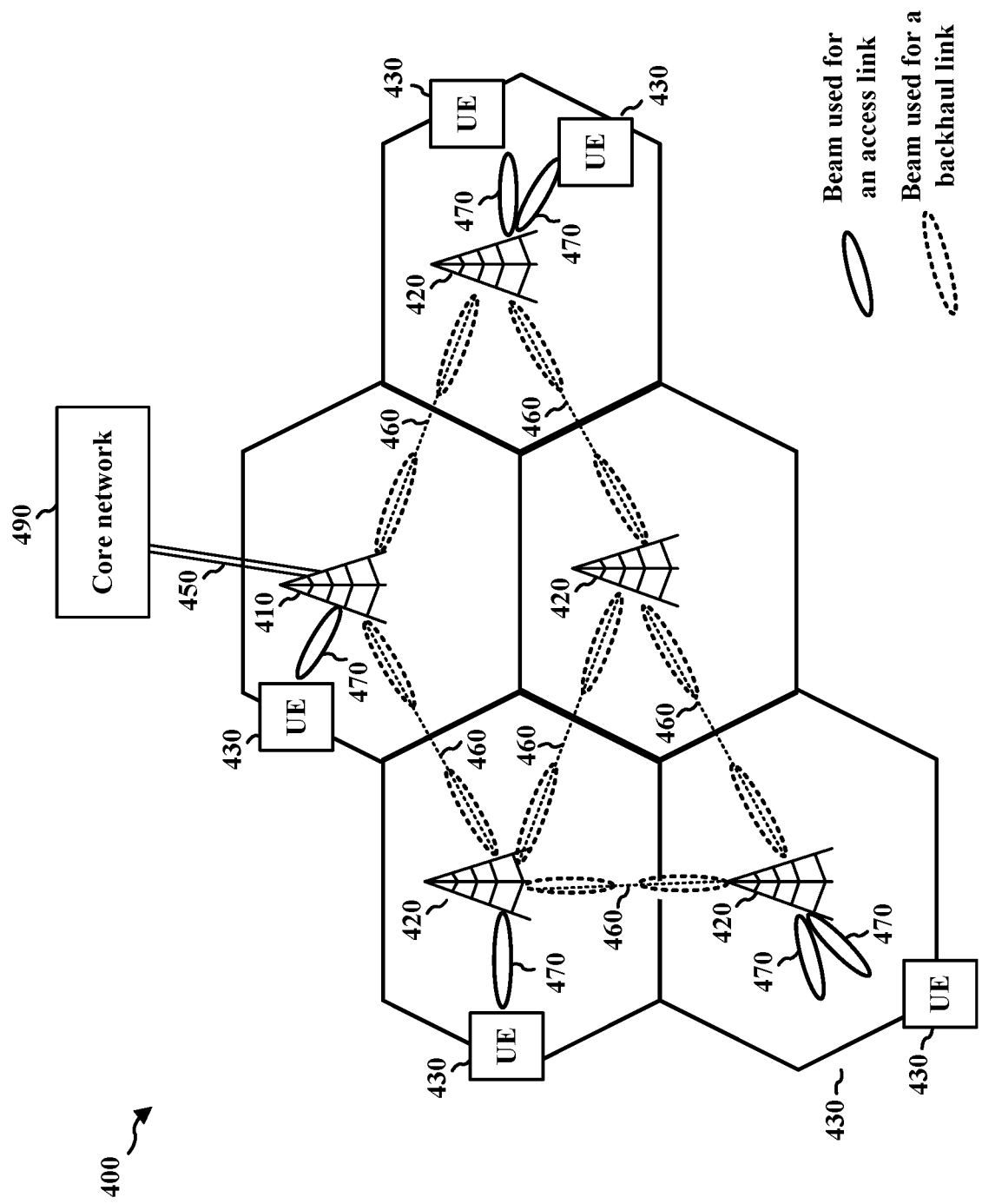
FIG. 4 illustrates an example IAB network.

FIG. 4 is a diagram illustrating an IAB network 400. The IAB network 400 may include an anchor node (that may be referred to herein as an "IAB donor") 410 and access nodes (that may be referred to herein as "IAB nodes") 420. The IAB donor 410 may be a base station, such as a gNB or eNB (such as base station 102 or 180 in FIG. 1), and may perform functions to control the IAB network 400. The IAB nodes 420 may include L2 relay nodes, etc. Together, the IAB donor 410 and the IAB nodes 420 may share resources to provide an access network and a backhaul network to core network 490. For example, resources may be shared between access links and backhaul links in the IAB network.

UEs 430 may interface with the IAB nodes 420 or the IAB donor 410 through access links 470. The IAB nodes 420 may communicate with each other and with the IAB donor 410 through backhaul links 460. The IAB donor 410 may be connected to the core network 490 via a wireline backhaul link 450. UEs 430 may communicate with the core network by relaying messages through their respective access link 470 to the IAB network 400, which then may relay the message through backhaul links 460 to the IAB donor 410 to communicate to the core network through the wireline backhaul link 450. Similarly, the core network may communicate with a UE 430 by sending a message to the IAB donor 410 through the wireline backhaul link 450. The IAB donor 410 may send the message through the IAB network 400 via backhaul links 460 to the IAB node 420 connected to the UE 430, and the IAB node 420 may send the message to the UE 430 via the access link 470.

Each IAB node, e.g., including IAB donor 410 and each IAB node 420, may use a physical cell identifier (PCI) value. The PCI value may serve as an identifier for that IAB donor 410 or IAB node 420. The PCI value may be used to determine a scrambling sequence that is applied to physical signals and/or channels that are transmitted by a particular IAB node. For example, a PSS and/or the SSS transmitted by the respective IAB donor 410 or IAB node 420 may be scrambled using a scrambling sequence that is based on the PCI used by the respective IAB node. A network may have a limited number of available PCI values. For instance, 5G NR systems may support a number of PCI values, e.g., 1008 PCI values. Accordingly, a given PCI value may be reused in the same network.

Figure 5:
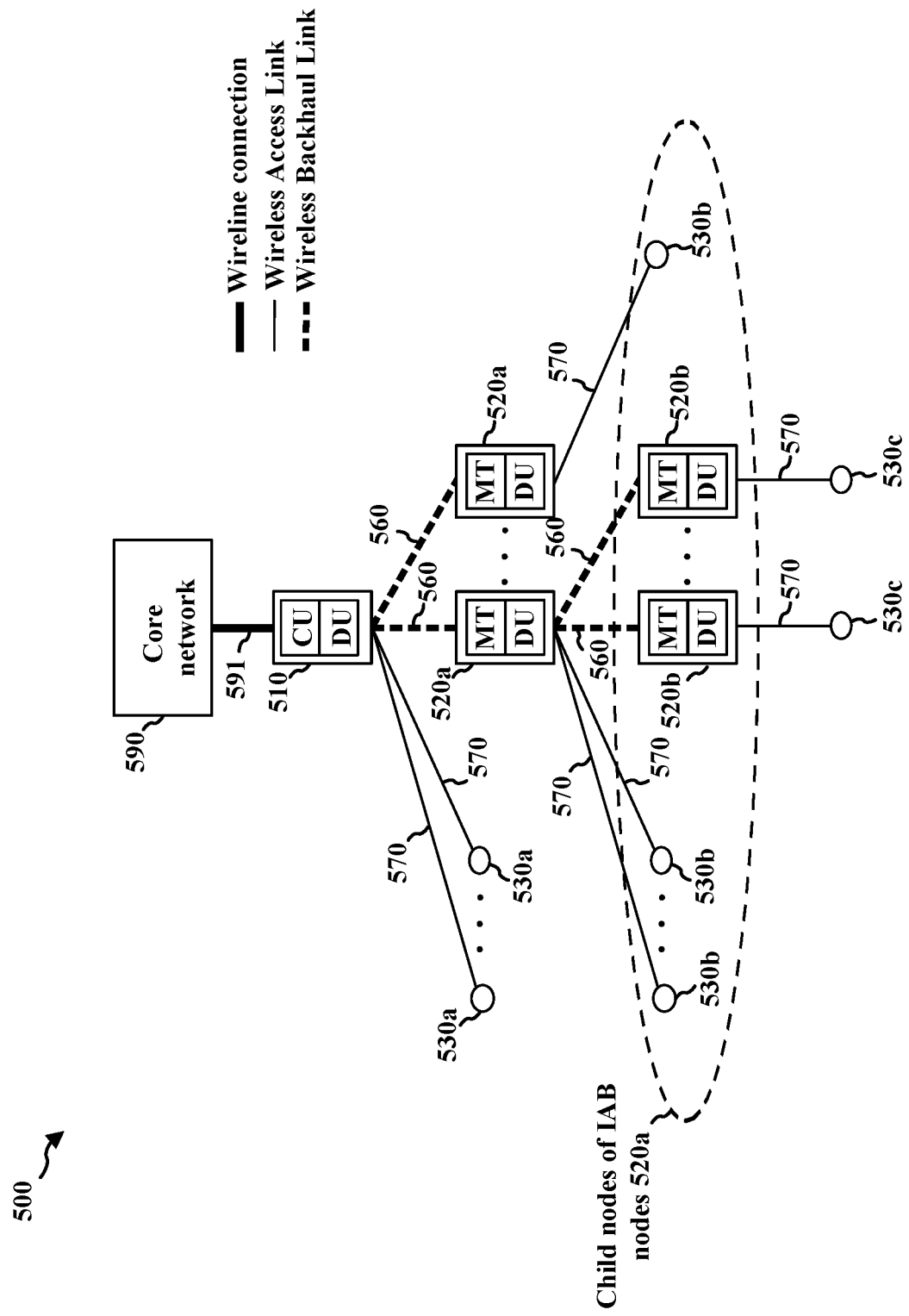
FIG. 5 illustrates example aspects of an IAB network including a distributed unit (DU) function and a mobile termination (MT) function of IAB noes in the IAB network.

FIG. 5 is a diagram illustrating an IAB network 500 and components thereof. The IAB network 500 may include an IAB donor 510 and IAB nodes 520a and 520b. The IAB nodes, as well as the IAB donor, may provide wireless access links to UEs 530.

The IAB donor 510 may be considered a root node of the tree structure of the IAB network 500. The IAB donor 510 may be connected to the core network 590 via a wired connection 591. The wired connection may include, e.g., a wireline fiber. The IAB donor 510 may provide a connection to one or more IAB nodes 520a. The IAB nodes 520a may each be referred to as a child node of the IAB donor 510. The IAB donor 510 may also provide a connection to one or more UE 530a, which may be referred to as a child UE of IAB donor 510. The IAB donor 510 may be connected to its child IAB nodes 520a via backhaul links 560 and may be connected to the child UEs 530a via access links 570. The IAB nodes 520a that are children nodes of IAB donor 510 may also have IAB node(s) 520b and/or UE(s) 530b as children. For example, IAB nodes 520b may further connect to child nodes and/or child UEs. FIG. 5 illustrates IAB nodes 520b providing an access link to UEs 530c, respectively.

The IAB donor 510 may include a central unit (CU) and a distributed unit (DU). The central unit CU may provide control for the IAB nodes 520a, 520b in the IAB network 500. For example, the CU may be responsible for the configuration of the IAB network 500. The CU may perform RRC/PDCP layer functions. The DU may perform scheduling. For example, the DU may schedule resources for communication by the child IAB nodes 520a and/or UEs 530a of the IAB donor 510.

The IAB nodes 520a, 520b may include a mobile termination (MT) and a DU. The MT of IAB node 520a may operate as a scheduled node, scheduled in a similar manner to a UE 530a by the DU of the parent node, e.g., IAB donor 510. The MT of IAB node 520b may operate as a scheduled node of parent node 520a. The DU of the IAB node 520a may schedule the child IAB nodes 520b and UEs 530b of the IAB node 520a. An IAB node may provide a connection to an IAB node and, in turn, provide a connection for another IAB node. The pattern of a parent IAB node including a DU that schedules a child IAB node/child UE may continue to have more connections than the example illustrated in FIG. 5.

Figure 6:
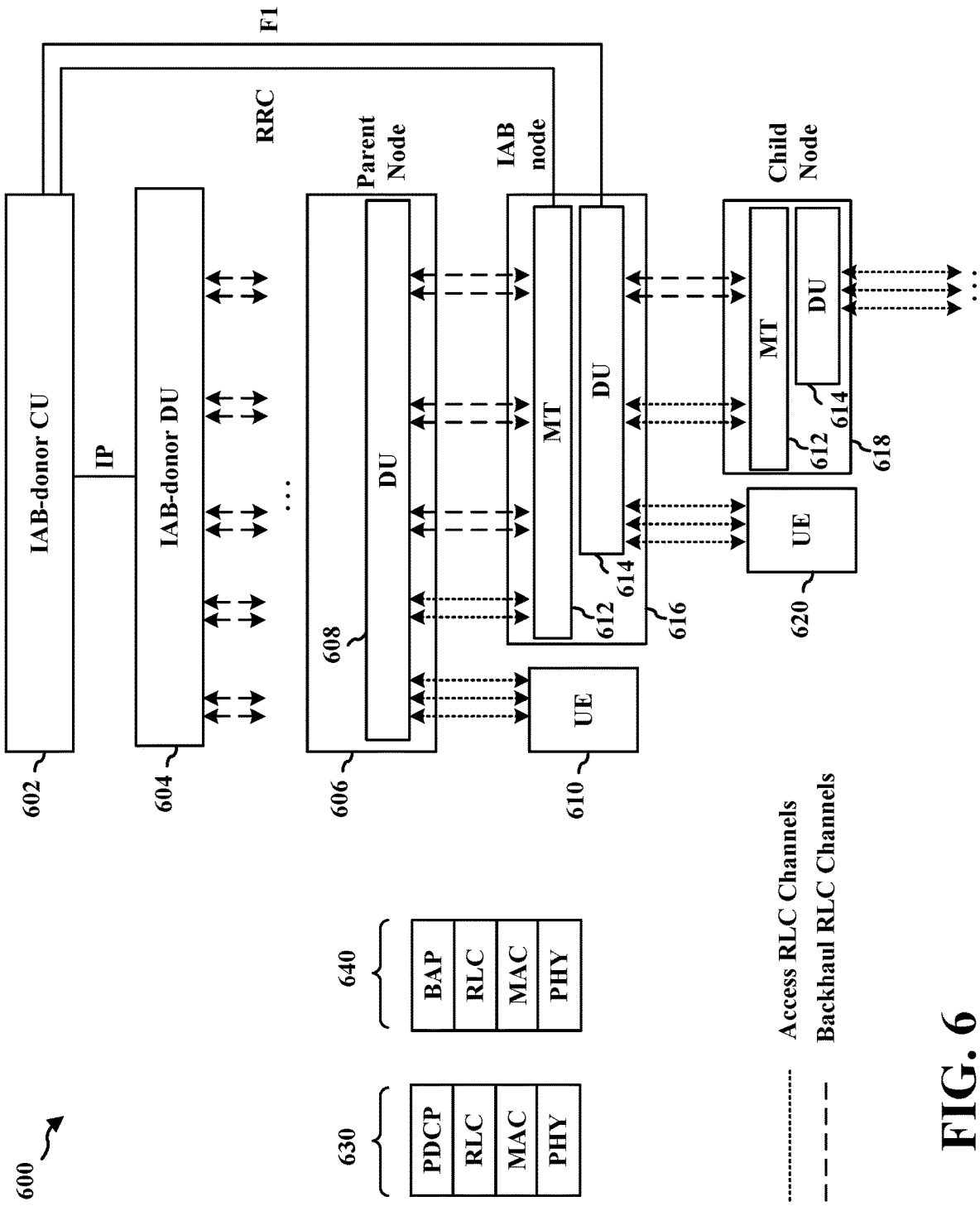
FIG. 6 illustrates an L2 structure of an IAB network.

FIG. 6 illustrates an example L2 structure 600 for an IAB network, such as the example IAB network 500 in FIG. 5. The IAB donor CU 602 may have an IP connection to an IAB donor DU 604. The donor DU 604 may provide multiple RLC backhaul channels to one or more parent IAB nodes 606. The backhaul RLC channels between the DU and MT may carry backhaul adaptation protocol (BAP) for backhauling of access traffic. The IAB node 606 may operate as a parent node to one or child nodes (e.g., IAB node 616) or UEs 610. The DU 608 of the IAB node 606 may provide an access RLC channel to one or more UEs 610 and/or MT 612 of an IAB node 616. The access RLC channels between the DU 608 and the UE 610 may carry PDCP for RRC or DRB. The access RLC channels between the DU 608 and the MT 612 may carry PDCP for RRC or DRB. The DU 608 of the IAB node 606 may provide backhaul RLC channels to the MT 612 of the IAB node 616. An access RLC channel protocol stack 630 is illustrated that shows the RLC layer with a PDCP layer, a MAC layer, and a PHY layer for an access link. A backhaul RLC channel protocol stack 640 is illustrated that shows the RLC layer with a BAP layer, a MAC layer, and a PHY layer for providing the backhaul links. Similar to the IAB node 606, the IAB node 616 may operate as a parent node to one or child nodes (e.g., IAB node 618) or UEs 610. The IAB node 616 may include a DU 614 that may provide an access RLC channel to one or more UEs 620 and/or MT 612 of an IAB node 618 and/or provide backhaul RLC channels to the MT 612 of the IAB node 618. The pattern may continue, and the IAB node 618 may serve additional child IAB nodes and/or UEs. The IAB node 606 may be referred to as an "intermediate node" or an "intermediate IAB node" between the IAB donor DU 604 and the IAB node 616 that serves UE 602. The IAB node 616 may be referred to as the "serving IAB node" or "serving node" for the UE 620.

Figure 7:
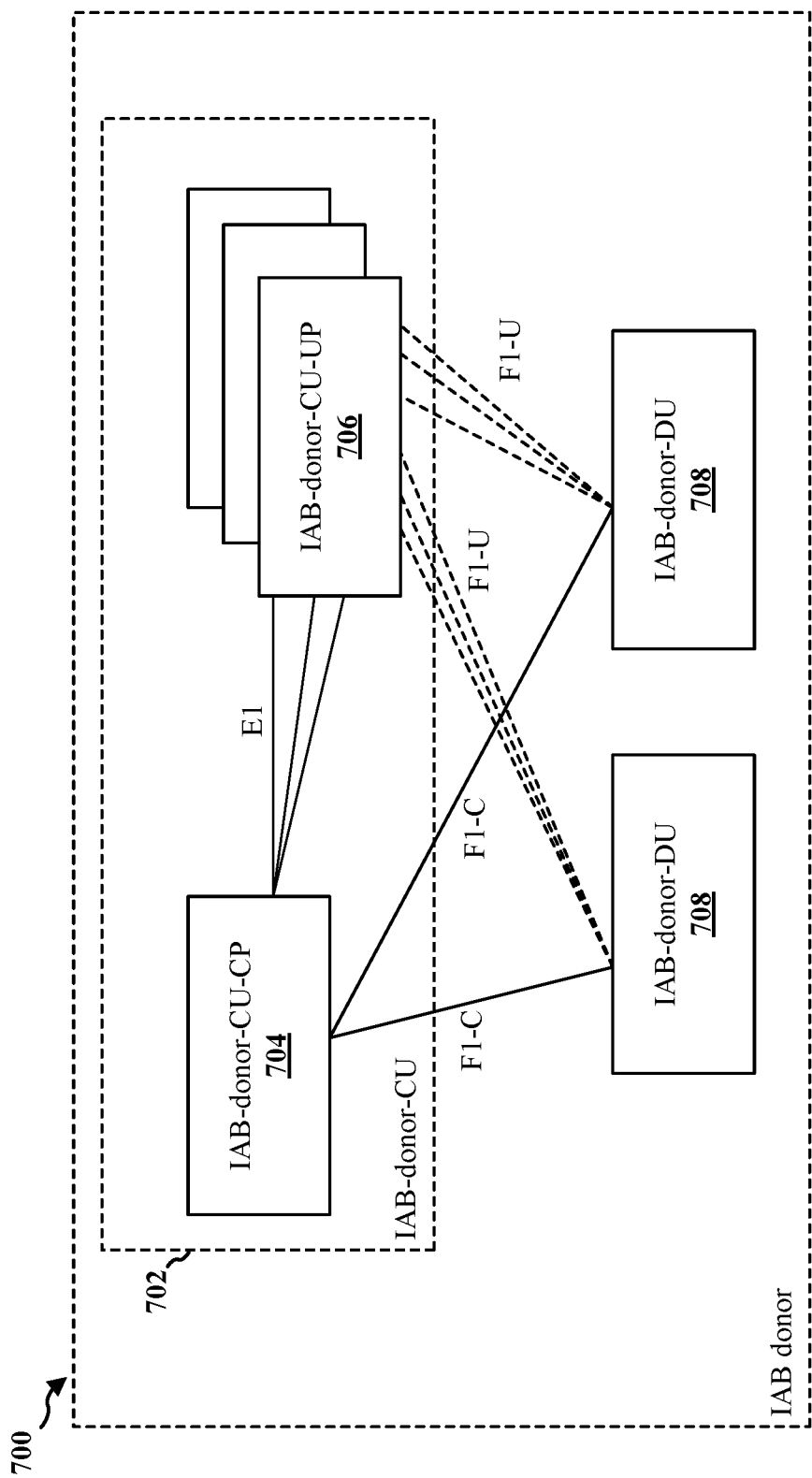
FIG. 7 illustrates an example architecture of an IAB donor.

FIG. 7 illustrates an overall architecture of an IAB donor 700 (e.g., IAB donor 510). Here, the IAB donor 700 may be a gNB of 5G/NR (e.g., gNB 180). The IAB donor 700 may include an IAB donor-CU 702 and one or more IAB donor-DUs 708. The IAB donor-CU 702 may include an IAB donor-CU-control plane (CP) (IAB donor-CU-CP) 704 and one or more IAB donor-CU-user planes (UPs) (IAB donor-CU-UP) 706. The IAB donor-CU-CP 704 may provide configuration controlling messages for all of the one or more IAB donor-DUs 708. The IAB donor-CU-UP 706 may transmit data packets from and to the IAB network (e.g., IAB network 500) through the IAB donor-DU 708. The IAB donor-CU-CP 704 and the one or more IAB donor-CU-UPs 706 may communicate with each other through an E1 interface. The IAB donor-CU-CP 704 and the one or more IAB donor-DUs 708 may communicate with each other through an F1 control plane interface (F1-C). The IAB donor-CU-UP 706 and the one or more IAB donor-DUs 708 may communicate with each other through an F1 user plane interface (F1-U).

Figure 8:
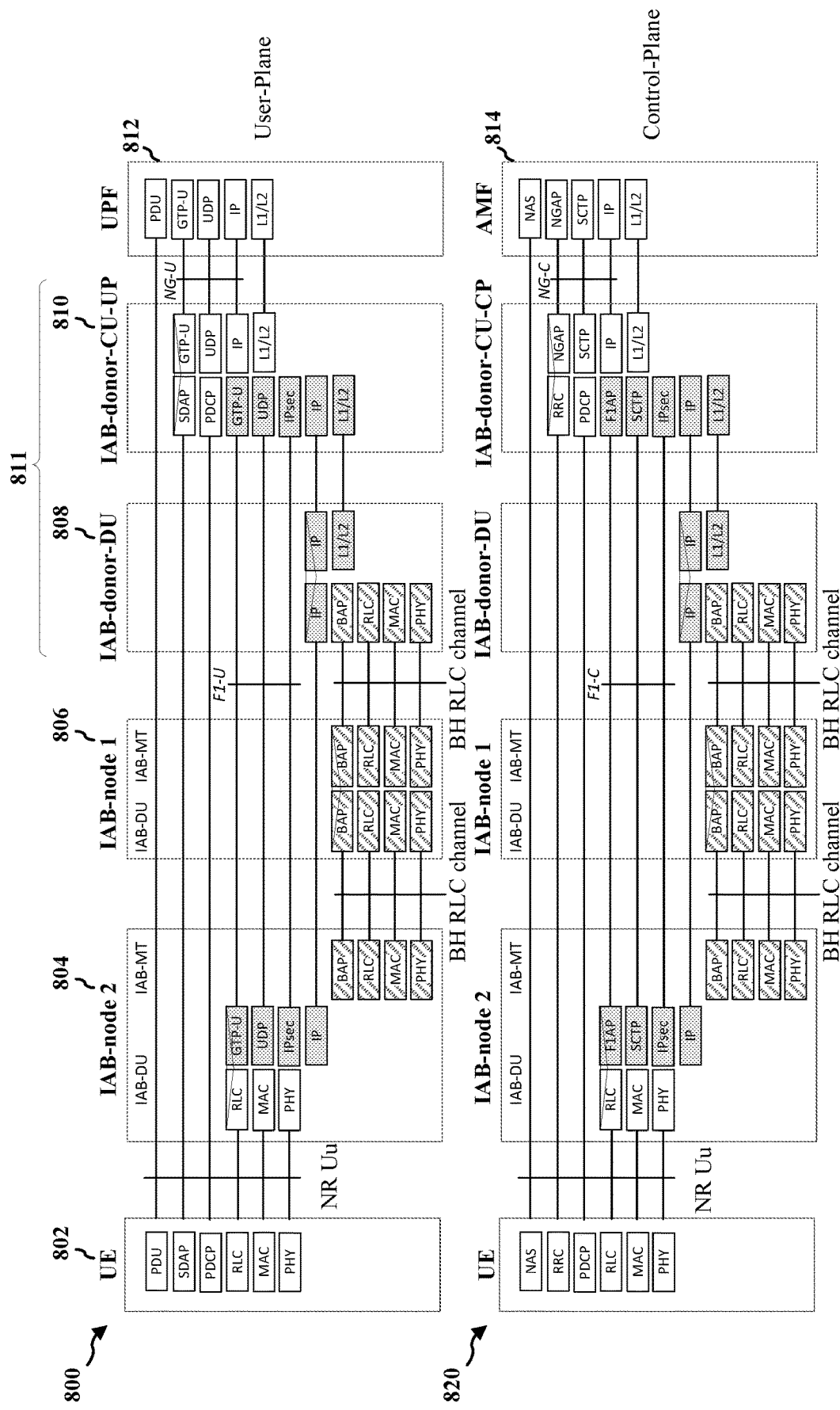
FIG. 8 illustrates a stack architecture of an IAB network.

FIG. 8 illustrates a stack architecture of the IAB network from a UE 802 (e.g., one or more UEs 530a/530b) to an IAB donor 811 (e.g., IAB donor 510/700). The stack architecture of the IAB network illustrates a stack architecture of the user plane 800 of the IAB network and a stack architecture of the control plane 820 of the IAB network. The stack architecture of the user plane 800 of the IAB network may include the stack structures of the user plane of the UE 802, an IAB node 2 804, an IAB node 1 806, an IAB donor-DU 808, an IAB donor_CU-UP 810, and a user plane function (UPF) 812 of the core network. The stack architecture of the control plane 820 of the IAB network may include the stack structures of the control plane of the UE 802, an IAB node 2 804, an IAB node 1 806, an IAB donor-DU 808, an IAB donor_CU-UP 810, and an access and mobility management function (AMF) 814 of the core network. Here, the IAB node 2 804 connected to the UE 802 may be referred to as a serving IAB node 804. The IAB node 1 806 provided along the path between the serving IAB node 804 and the IAB donor 811 may be referred to as an intermediate IAB node 806.

The connection between the UE 802 and the serving IAB node 804 may be referred to as an NR link (or the NR Uu interface) and the RLC channel between the UE 802 and the serving IAB node 804 may be referred to as an access RLC channel.

The UPF 812 of the core network and the IAB donor 811 may be connected to each other via an NG user plane interface (NG-U), and the AMF 814 of the core network and the IAB donor 811 may be connected to each other via an NG control plane interface (NG-C).

The intermediate IAB node 806 may provide a backhaul connection between the serving IAB node 804 and the IAB donor 811. The RLC channel between the serving IAB node 804 and the IAB donor 811 via the intermediate IAB node 806 may be referred to as a backhaul RLC channel.

The intermediate IAB node 806 may have BAP layers configured to route the data packets between the IAB donor 811 and the serving IAB node 804. The data packets on the BAP layers may have a routing ID embedded in a BAP header of the data packets so that the data packets may be routed through the intermediate IAB node 806 between the IAB donor 811 and the target serving IAB node 804. The serving IAB 804 may receive and transmit the data packets to and from the UE 802.

Although FIG. 8 illustrates that the IAB network may include one intermediate IAB node 806, aspects of the disclosure are not necessarily limited thereto, and the IAB network may include multiple intermediate IAB nodes. Accordingly, the IAB network may have more than one (1) path between the serving IAB node 804 and the IAB donor 811 established via the multiple intermediate IAB nodes.

A Quality of Service (QoS) flow may be the finest level of granularity of QoS differentiation in a protocol data unit (PDU) session. One or more QoS flows may be mapped to a data radio bearer (DRB), e.g., at an SDAP layer. Examples of QoS parameters may include a 5G QoS indicator (5QI), a flow bit rate (e.g., for a guaranteed bit rate (GBR), an aggregation bit rate (e.g., per PDU session, per UE), or an allocation and retention policy (ARP), among other examples. Examples of 5QI characteristics may include any of a type, a QoS priority level, a packet delay budget (PDB), a dynamically assigned 5QI, a packet error rate (PER), a delay-critical indication, an averaging window, a maximum data burst volume, an extended packet delay budget, a core network (CN) PDB downlink, a CN PDB uplink, etc. The QoS information may be provided by a CU to a serving DU for a UE. For example, in FIG. 5, the CU of the IAB donor 510 may provide the QoS information to a DU of IAB node 520b that is serving UE 530c. Similarly, the CU 602 in FIG. 6 may provide the QoS information to the DU 608 that serves UE 610 or may provide QoS information to DU 614 of IAB node 616 that serves UE 620. The CU may provide the QoS information to the serving DU for a UE per DRB and per QoS flow, e.g., via an F1-AP message.

For example, a UE context setup message over an F1-AP may indicate a DRB to be set up with setup item information elements (IEs) that include a DRB identifier (ID), choice QoS information, and an E-UTRAN QoS. The setup item IEs may further include DRB information, including one or more of a DRB QoS, a Single Network Slice Selection Assistance Information (N-SSAI), or notification control. The setup item IEs may further include a flow mapped to a DRB item, including one or more of a QoS flow identifier, a QoS flow level QoS parameter, a QoS flow mapping indication, or a time-sensitive communication (TSC) traffic characteristics. A UE context setup message may indicate one or more backhaul RLC channels to be set up. The IEs for the backhaul RLC Channel to be set up may include one or more of a backhaul RLC channel ID, choice backhaul QoS information, or E-UTRAN backhaul RLC Channel QoS, a control plane traffic type, and RLC mode, a BAP control PDU channel, traffic mapping information, or a configured BAP address. The choice QoS characteristics may indicate one or more of a non-dynamic 5QI (e.g., with a non-dynamic 5QI descriptor), a dynamic 5QI (e.g., with a dynamic 5QI descriptor), a RAN ARP, GBR QoS flow information, reflective QoS attribute, a PDU session ID, an uplink PDU session aggregate maximum bit rate, or a QoS monitoring request. The QoS parameters may define the QoS to be applied to a QoS flow, to a DRB, or to a backhaul RLC channel. For a backhaul RLC channel, the IEs and the GBR QoS flow information IE may be applicable, where the GBR QoS flow information may be present if the backhaul RLC channel conveys the traffic belonging to a GBR QoS flow. A dynamic 5QI may indicate QoS characteristics for a non-standardized or not-preconfigured 5QI for downlink and uplink communication. A non-dynamic 5QI may indicate the QoS characteristics for a standardized or preconfigured 5QI for downlink and uplink.

The PDB may define an upper bound for the time that a packet may be delayed between the UE and the UPF that terminates an N6 interface. In some examples, the PDB may be indicated in units of 0.5 ms. The extended PDB, CN PDB downlink, or CN PDB uplink may be indicated in units of 0.01 ms. For a backhaul RLC channel, the PDB may define an upper bound for the time that a packet may be delayed between an IAB-DU and its child IAB-MT. The PDB may be a QoS characteristic.

Figure 9:
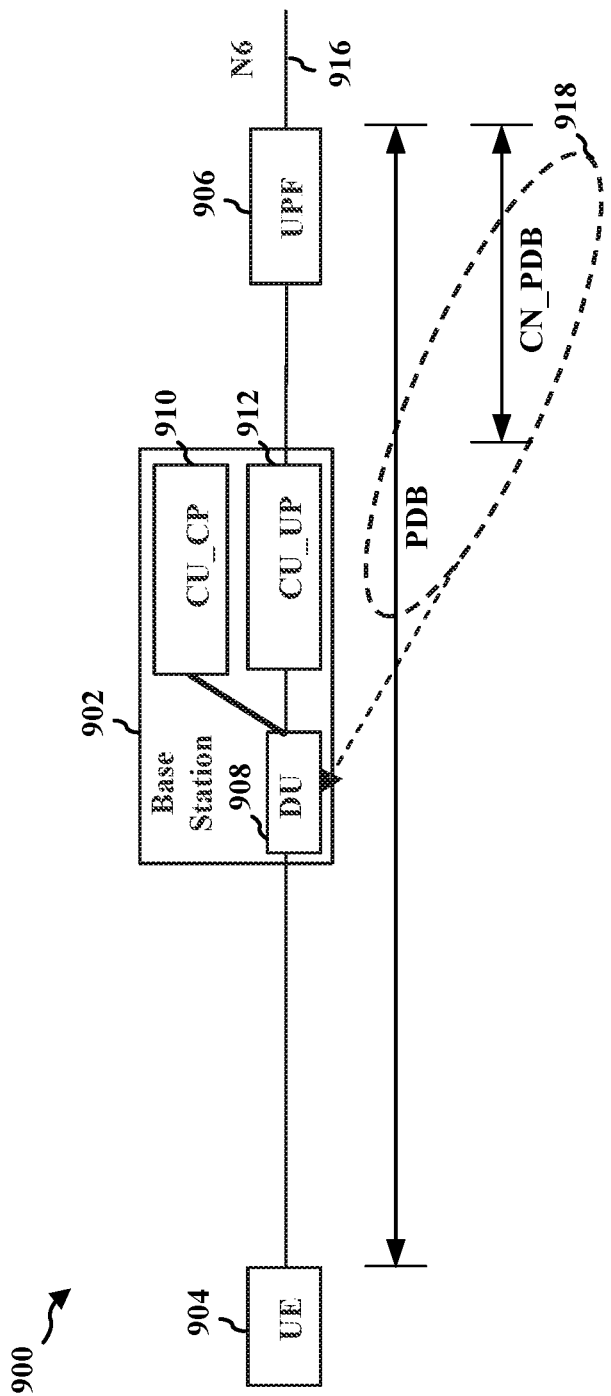
FIG. 9 illustrates example aspects of a PDB for an access network.

FIG. 9 illustrates an example diagram 900 showing the PDB for delivering a packet between a UPF 906 terminating at the N6 interface 916 and a UE 904. FIG. 9 also illustrated a CN PDB between the UPF 906 and the access network 902. As illustrated, the access network 902 may include a DU 908 and a CU control plane (CU-CP) 910, and a CU user plane (UP) 912. The CN PDB may be a static value (e.g., non-dynamic) or may be dynamically configured by a CU via an F1-AP. As illustrated in FIG. 9 with the dashed line 918, the PDB and the CN PDB may be provided to the DU 908 per DRB and per QoS flow. For example, the PDB and CN PDB may be provided by the CU to the DU via an F1-AP.

The delay budget that applies to the radio interface may be determined by subtracting a static value for the CN PDB, which represents the delay between any UPF 906 terminating N6 916 (that may possibly be selected for the PDU Session) and the access network 902 from a given PDB. For GBR QoS flows using a delay-critical resource type, in order to obtain a more accurate delay budget PDB available for a RAN, a dynamic value for the CN PDB can be used, which represents the delay between the UPF 906 terminating N6 for the QoS flow and the access network 902. If used for a QoS flow, the RAN may apply the dynamic value for the CN PDB instead of the static value for the CN PDB, e.g., which may be related to the 5QI. As an example, a static value for the CN PDB of 1 ms, 2 ms, 5 ms, etc., for the delay between a UPF terminating N6 and an access network may be subtracted from a given PDB to derive the packet delay budget that applies to the radio interface.

Figure 10:
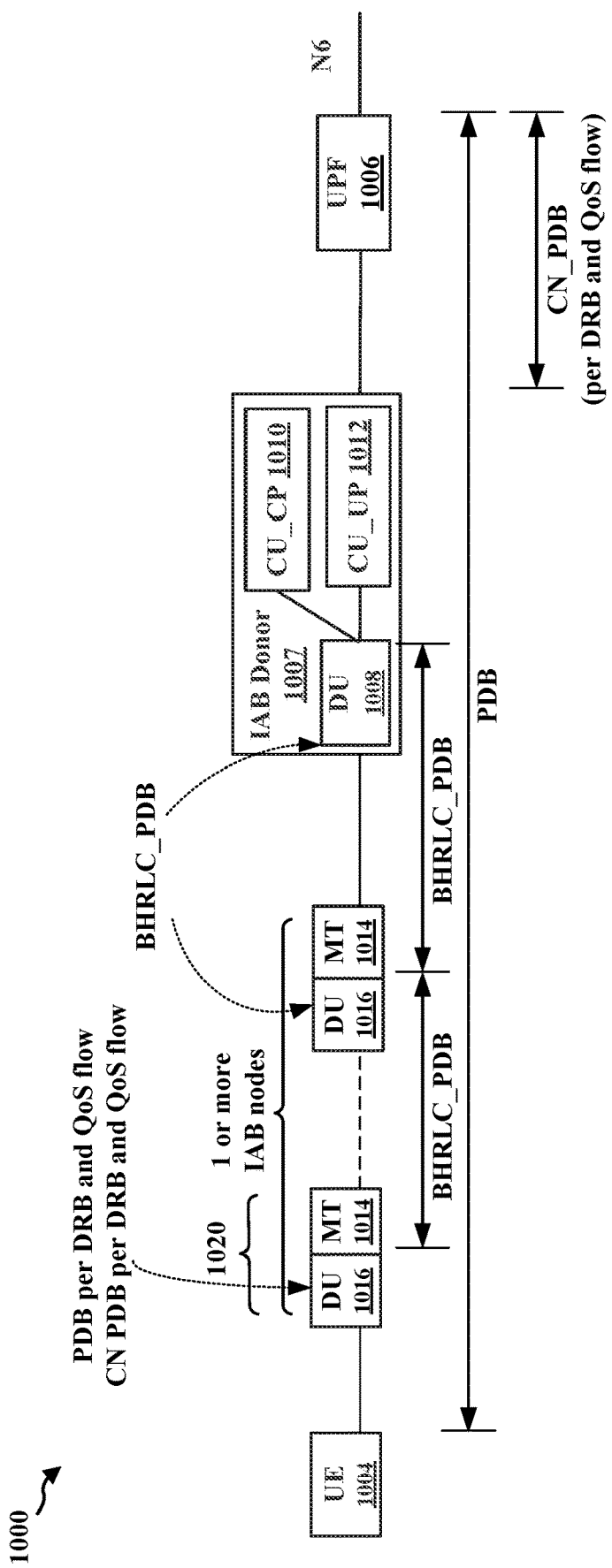
FIG. 10 illustrates example aspects of a PDB for an IAB network.

FIG. 10 illustrates an example of an IAB network 1000, including a UE 1004 that exchanges communication with the UPF 1006 via the IAB donor 1007 having a CU CP 1010, a CU UP 1012, and a DU 1008. One or more intermediate IAB nodes may provide a connection between the IAB node 1020 serving the UE 1004 and the IAB donor 1007. Each IAB node may include a DU 1016 and an MT 1014, e.g., as described in connection with FIGS. 5 and 6. A PDB per backhaul RLC channel may be provided to the intermediate IAB-DU. The PDB per backhaul RLC channel may provide an upper delay bound between an IAB DU and a child MT, e.g., between DU 1016 of a parent IAB node and an MT 1014 of a child IAB node served by the parent IAB node. Thus, the PDB per backhaul RLC channel (illustrated at "BHRLC_PDB" in FIG. 10) may provide a delay bound for a single hop between IAB nodes. The PDB and CN PDB may be provided per DRB and per QoS flow to the serving IAB node 1020 of the UE 1004, e.g., without being provided to the intermediate nodes. The PDB and CN PDB may be provided to the serving IAB node 1020, similar to the example described in FIG. 9, e.g., from the CU (e.g., CU-CP 1010) of the IAB donor to the DU 1016 of the serving IAB node 1020. The CU may indicate a one-hop PDB (e.g., the backhaul RLC PDB) to an intermediate IAB node DU. The intermediate IAB node may not know the end-to-end PDB of a QoS flow that is aggregated to the backhaul RLC.

Figure 11:
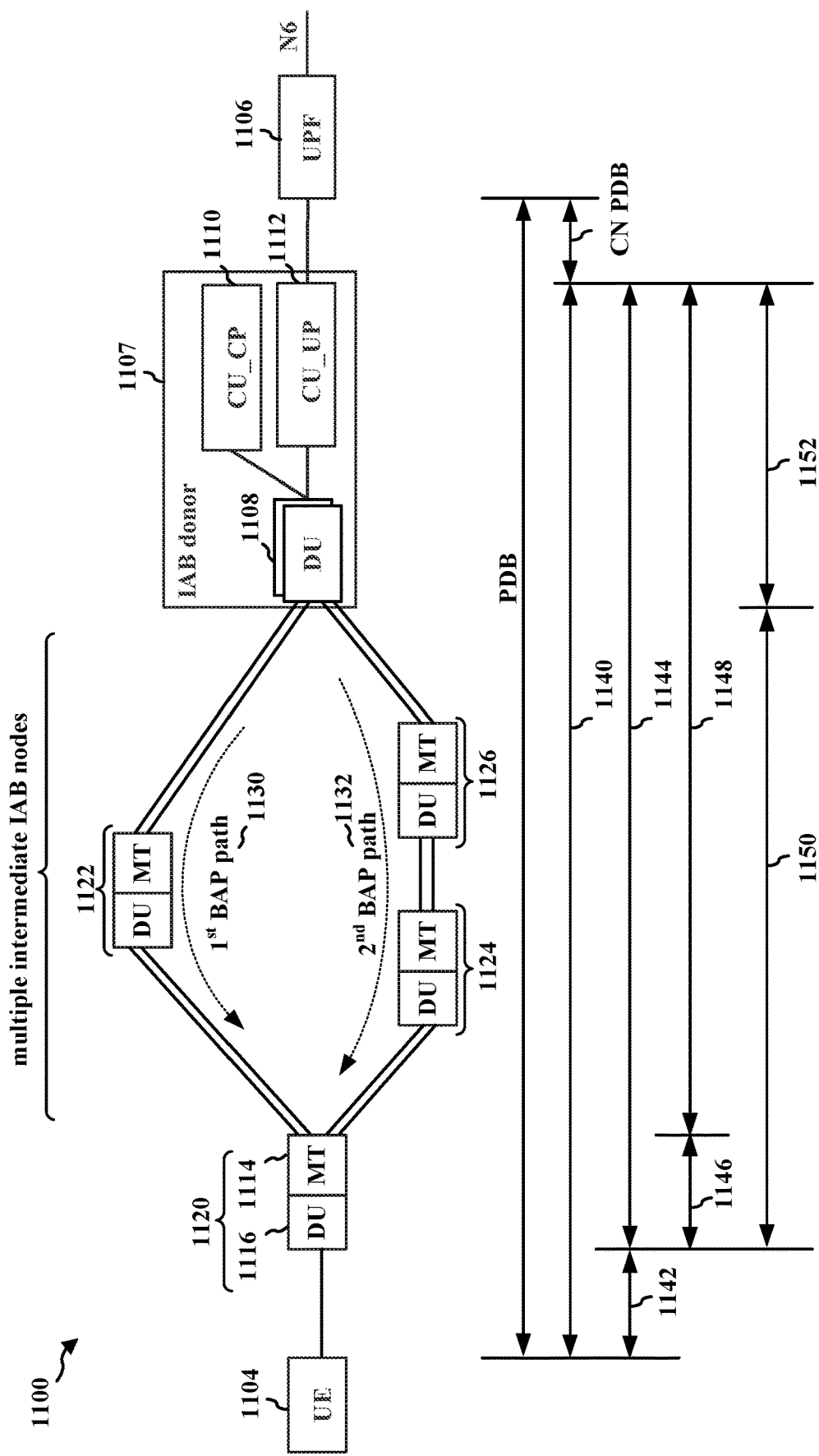
FIG. 11 illustrates an example of an IAB network with multiple intermediate IAB nodes.

FIG. 11 illustrates an example of IAB network 1100 with multiple intermediate IAB nodes. Referring again to FIG. 10, a UE 1104, a UPF 1106, an IAB donor 1107 including a DU 1108, a CU_CP 1110, and a CU_UP 1112, and an IAB node 1120 including an MT 1114 and a DU 1116 of FIG. 11 may correspond to a UE 1004, the UPF 1006, the IAB donor 1007 including the DU 1008, the CU_CP 1010, and the CU_UP 1012, and the IAB node 1020 including the MT 1014 and the DU 1016 of FIG. 10. The example of IAB network 1100 may include multiple intermediate IAB nodes 1122, 1124, and 1126, and the multiple intermediate IAB nodes 1122, 1124, and 1126 may have wireless backhaul connection between the IAB node 1120 and the IAB donor 1107.

Referring again to FIG. 9, the CN PDB may be a static value (e.g., non-dynamic) or may be dynamically configured by a CU via an F1-AP. Also, the PDB and the CN PDB may be provided to the DU 1116 of the IAB node 1120 per DRB and per QoS flow. For example, the PDB and the CN PDB may be provided by the CU of the IAB donor 1107 to the DU via an F1-AP. Accordingly, the IAB node 1120 may determine the PDB-CN PDB 1140 between the CU of the IAB donor 1107 and the UE 1104 based on the PDB and the CN PDB provided by the CU of the IAB donor 1107.

The IAB node 1120 may determine the access PDB 1142 between the UE 1104 and the DU 1116 of the IAB node 1120 by subtracting an F1U_PDB 1144 between the CU of the IAB donor 1107 and the DU 1116 of the IAB node 1120 from the PDB-CN PDB 1140. Due to the multiple intermediate IAB nodes 1122, 1124, and 1126 of the wireless backhaul connection between the IAB node 1120 and the IAB donor 1107, the F1U_PDB may have various latency. Therefore, the PDB and the CN_PDB provided per DRB may not be sufficient for the IAB node 1120 to determine the upper delay bound (e.g., the access PDB 1142) over the access link. For example, the F1U_PDB may be provided via an operation, administration, and maintenance (OAM) configuration, which refers to an implementation-specific approach, where direct configuration is done by the service provider via an OAM configuration software without utilizing specification-defined signaling message. However, providing the F1U_PDB as the OAM configuration may not be a good solution due to the time-varying nature of the wireless BH connection. The latency variation over the wireless backhaul may be due to various factors or parameters.

For example, different BAP routing paths may have a different number of hops, link qualities, traffic loading, etc., which may cause the latency variation over the wireless backhaul. For example, FIG. 11 illustrates that a $1^{st}$ BAP path 1130 may include one (1) intermediate IAB node 1122 and that a $2^{nd}$ BAP path 1132 may include two (2) intermediate IAB nodes 1124 and 1126. Accordingly, the number of IAB nodes in the respective BAP path may contribute to the latency variation over the wireless backhaul connection.

For another example, note that data packets taking the same BAP routing path may be allocated with different types of BH RLC channels and thus experience different BH latency. That is, among the same BAP path, different types of BH RLCs may have different priority treatments. Therefore, their QoS specification may be different, which may cause latency variation over the wireless BH connection. That is, each BH RRC channel may be intended for different kinds of traffic. For example, a BH RLC channel may be intended for low latency traffic such as ultra-reliable low latency communication (URLLC), and therefore the delay budget for the BH RLC channel may be smaller. For another example, a BH RLC channel may be intended for best-effort traffic, and therefore the delay budget for the BH RLC channel may be higher. Accordingly, each of the BH RRC channels for the same BAP path may have different latency.

For yet another example, the latency of the wireless BH connection may change due to various reasons. For example, a topology of the wireless BH connection may change to adapt to the radio link quality (e.g., RLF) or for the purpose of loading balancing, etc. Accordingly, the radio link quality of the wireless BH connection or the number of hops and intermediate IAB nodes may change, causing the over the wireless BH connection.

Accordingly, the IAB node 1120 can be indicated by the IAB donor 1107 CU with one or more delay parameters. The IAB node 1120 may determine the upper delay bounds (e.g., the access PDB 1142) over its access links with the UE 1104 based at least in part on the indicated delay parameters. For example, the indicated delay parameters may include access latency bounds (e.g., access PDB 1142) for an access link between the DU 1116 of the IAB node 1120 and the UE 1104.

The indicated delay parameters may also be variations of wireless BH latency bounds. For example, the indicated delay parameters may include the F1U_PDB 1144, which refers to the PDB between the IAB donor 1107 and the DU 1116 of the IAB node 1120. Accordingly, the IAB node 1120 may determine the access PDB as follows:

$$\text{access PDB (1142)} = \text{PDB} - \text{CN\_PDB} - \text{F1U\_PDB (1144)} \quad (1)$$

Here, as proffered, the PDB and the CN_PDB are provided via F1-AP signaling message.

For another example, the indicated delay parameters may include an F1U_PDB' 1148, which refers to the PDB between the IAB donor 1107 and the MT 1114 of the IAB node 1120. Accordingly, the IAB node 1120 may determine the F1U_PDB 1144 as follows:

$$\text{F1U\_PDB (1144)} = \text{F1U\_PDB' (1148)} + \text{proc\_PDB (1146)} \quad (2)$$

Here, the proc_PDB 1146 refers to a PDB between the collocated MT 1114 and DU 1116, which may be provided as the OAM configuration.

For another example, the indicated delay parameters may include different components of F1U_PDB 1144. That is, the indicated delay parameters may include a BAPRouting_PDB 1150, which refers to the PDB between the DU 1108 of the IAB donor 1107 and the DU 1116 of the IAB node 1120. Accordingly, the IAB node 1120 may determine the F1U_PDB 1144 as follows:

$$\text{F1U\_PDB (1144)} = \text{BAPRouting\_PDB (1150)} + \text{donor\_PDB (1152)} \quad (3)$$

Here, the donor_PDB 1152 refers to the PDB between the CU of the IAB donor 1107 and the DU 1116 of the IAB node 1120 and may be included in the indicated delay parameters. In another example, the indicated delay parameters may include the BAPRouting_PDB 1150, and the donor_PDB 1152 may be provided as the OAM configuration since the donor_PDB 1152 is the PDB of the wired connection within the IAB donor 1107, and therefore, has less latency variation.

Although FIG. 11 illustrates that the UE 1104 is connected to the serving IAB node 1120 over the air link, the aspects of the disclosure are not necessarily limited thereto. For example, 1104 may be a child node 1104, and 1120 may be a parent node 1120, and the air link between the child node 1104 and the parent node 1120 may be an access RLC channel. Accordingly, the parent node 1120 may determine an access PDB over the access RLC channel between the parent node 1120 and the child node 1104 based in part on the delay parameters received from the CU of the IAB donor 1107.

The above one or more delay parameters (i.e., F1U_PDB and its variations) of the BH latency bounds may be indicated at various granularity levels from the IAB donor 1107 to the IAB node 1120. Accordingly, the IAB node 1120 may calculate the access PDB over the wireless access link between the DU 1116 of the IAB node 1120 and the UE 1104 at various granularity levels. For example, the delay parameters may be indicated at different granularity levels, including per one of the IAB nodes, per BAP-routing path, per the UE DRB, or per a general packet radio service (GPRS) tunneling protocol (GTP) user plane (GTP-U) tunnel of the UE DRB, from a coarser granularity level to a finer granularity level. The delay parameters with fine granularity may enable the IAB node to determine a better-optimized access PDB, with a higher cost of signaling overhead. Also, the delay parameters with coarse granularity may have a lower cost to reserve the signaling overhead, but the access PDB determined by the IAB node may have lower accuracy.

In one aspect of the disclosure, for the IAB node, the finest granularity for an IAB node to identify the delay parameters and the latency specifications may be per GTPU tunnel of the UE DRB. The DRB of a UE may be configured with up to 4 GTPU tunnels, and data packets from different GTPU tunnels may be mapped to different access RLC channels at the serving IAB node. For example, depending on the configuration of the routing table and traffic mapping table, different GTPU tunnels may take different BAP routing paths and/or different chains of BH RLC channels. For another example, data packets that belong to the same GTPU tunnel may follow the same routing path and the same chain of BH RLC channels.

In another aspect of the disclosure, depending on the network deployment scenarios, a lower granularity level (e.g., per IAB node or per BAP-routing path) may be sufficient to identify the delay parameters and the latency specifications. For example, the wireless BH network may provide a single routing path for a destination node (e.g., a wireless BH network with spanning tree architecture), and a single BH RLC channel type may be established for all data traffic types. Accordingly, the IAB node may determine a single PDB since different DRBs may experience similar BH latency.

In one example, the wireless BH may operate at a different band with a larger bandwidth than the access link between the IAB node and the UE. That is, the access PDB may be greater than the F1U_PDB between the CU of the IAB donor and the DU of the IAB node, and the latency bottleneck may mainly occur at the access links. In this case, though packets for different DRBs may take different backhaul routing paths and/or different chains of BH RLC channels, the variation of F1U_PDBs between these backhaul paths may be insignificant compared with latency over the access link. Thus, a single value of F1U_PDB may be sufficient to be applied over different DRBs for the determination of the corresponding access PDB per DRB. Accordingly, different latency bounds (or different delay parameters) may be indicated at different granularity levels. In one aspect, the BH latency bound (i.e., F1U_PDB and its variation) may be indicated by the IAB donor per IAB node, and the IAB node may determine the access latency bound (or the access PDB for each DRB of the UEs served by the IAB node, as follows:

$$\text{access PDB}_{per\ DR} = (\text{PDB} - \text{CN\_PDB})_{per\ DRB} - \text{F1U\_PDB}_{per\ IAB\ node} \quad (4)$$

In one example, the CU of the IAB donor may determine a single value for the F1U_PDB by considering the worst latency of the corresponding wireless backhaul connection, over all possible BAP routing paths and chains of BH RLC channels to this IAB node. For example, the latency bound or the delay parameters may be indicated by non-UE associated F1-AP messages and/or the RRC messaging.

In one aspect, the BH latency bound may be indicated per the BAP-routing path of the IAB node. For example, the IAB donor may indicate a table of delay bounds indicated to the IAB node as follows: (BAP-routing path1, delaybound1), (BAP-routing path2, delaybound2), . . . , (BAP-routing path n, delaybound_n). For example, the latency bound or the delay parameters may be indicated by non-UE associated F1-AP messages and/or the RRC messaging. The IAB node may receive the table of delay bounds indicated per the BAP-routing paths and determine the corresponding upper delay bound for access link for each GTPU tunnel of the UE DRB associated with the BAP-routing path IDs. Each of the GTPU tunnels of a UE DRB may be associated with the BAP-routing path IDs based on a configuration received from IAB donor CU. Accordingly, IAB node may determine each GTP-U tunnel of a UE DRB associated with the BAP routing path ID based on the configuration from the IAB donor-CU and further determine the corresponding upper delay bound for the access link, as follows:

$$\text{access PDB}_{per\ GTPU\ tunnel\ of\ DRB} = (\text{PDB-CN\_PDB})_{per\ DRB} - \text{F1U\_PDB}_{per\ BAP\text{-}path\ of\ IAB\ node}$$
(BAP path ID associated with a GTPU tunnel of a DRB) (5)

In one aspect, the BH latency bound may be indicated per DRB of a UE. For example, the latency bound or the delay parameters may be indicated by UE associated F1-AP messages and/or the RRC messaging. For example, the BH latency bound may be explicitly indicated with a new signaling parameter. That is, the IAB donor may signal the F1U_PDB per DRB as separate signaling, and the IAB node may determine the access PDB as follows:

$$\text{access PDB}_{per\ DRB} = (\text{PDB-CN\_PDB})_{per\ DRB} - \text{F1U\_PDB}_{per\ DRB}$$ (6)

For example, the BH latency bound may be absorbed by the CN_PDB. That is, the IAB node may receive the CN_PDB carried by existing F1-AP signaling, and the IAB node may re-interpret the CN_PDB as including the F1U_PDB component. The IAB node may determine the access PDB as follows:

$$\text{access PDB}_{per\ DRB} = (\text{PDB-CN\_PDB}_{(including\_F1U\_PDB)})_{per\ DRB}$$ (7)

In one aspect, the BH latency bound may be indicated per GTP-U tunnel of a DRB of a UE. For example, the latency bound or the delay parameters may be indicated by UE associated F1-AP messages and/or the RRC messaging. That is, the IAB node may determine the access PDB as follows:

$$\text{access PDB}_{per\ GTPU\ tunnel\ of\ a} = (\text{PDB-CN\_PDB})_{per\ DRB} - \text{F1U\_PDB}_{per\ GTPU\ tunnel\ of\ a\ DRB}$$ (8)

In one aspect, the IAB donor may directly indicate the access latency bound (i.e., access PDB) per DRB or per GTP-U tunnel of a DRB to the IAB node. For example, the latency bound or the delay parameters may be indicated by UE associated F1-AP messages and/or the RRC messaging.

In some aspects, the latency bound or the delay parameters may be indicated by the IAB donor CU to the IAB node via the F1-AP messages and/or the RRC messaging.

Figure 12:
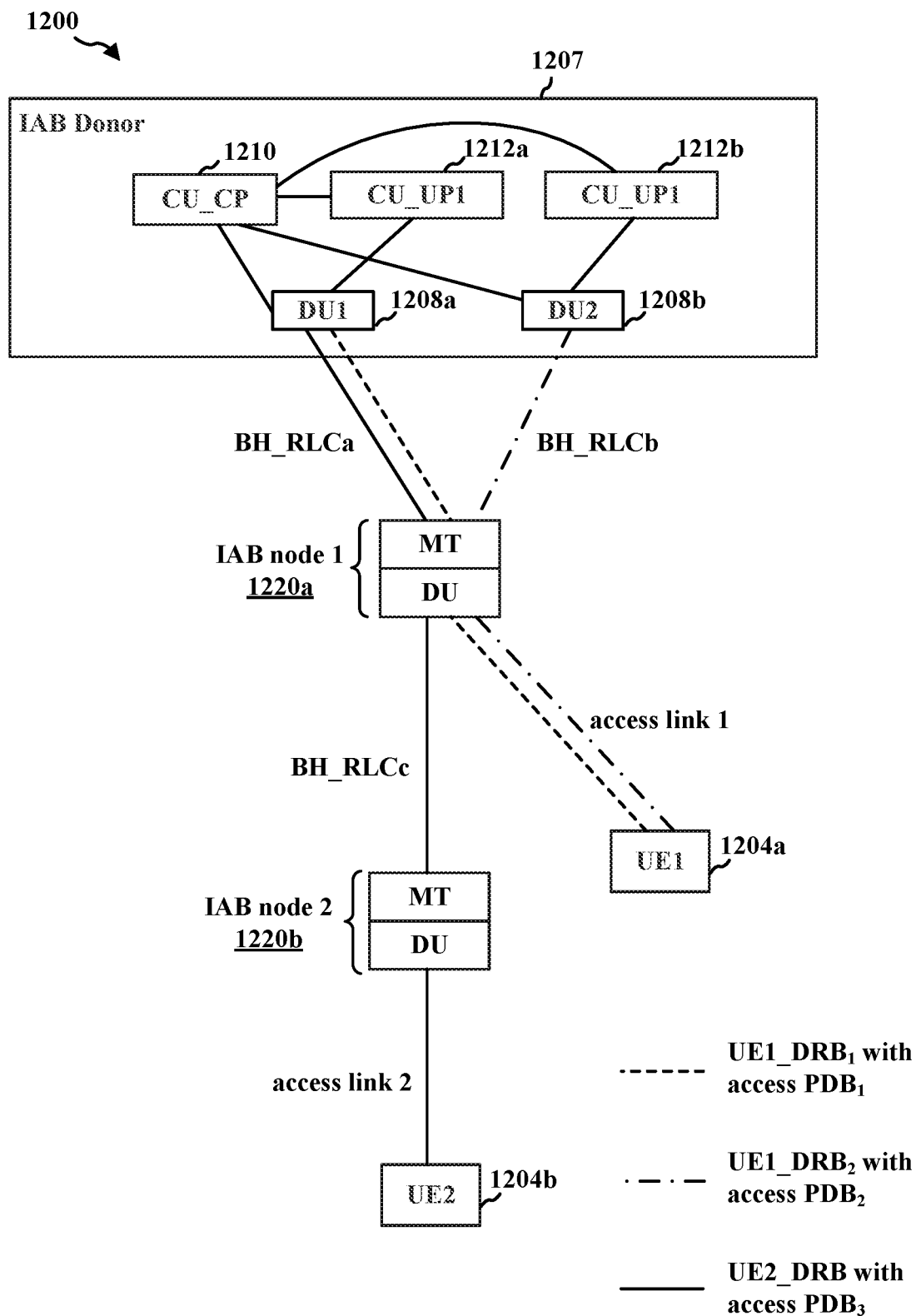
FIG. 12 illustrates an example of an IAB network.

FIG. 12 illustrates an example of IAB network 1200. The example of IAB network 1200 may include a UE1 1204*a*, a UE2 1204*b*, a first IAB node 1220*a*, and a second IAB node 1220*b*. Referring again to FIG. 12, an IAB donor 1207, including a DU1 1208*a* and a DU2 1208*b*, a CU_CP 1210, and a CU_UP1 1212*a* and a CU_UP2 1212*b* of FIG. 12 may correspond to the IAB donor 1107, including the DU 1108, the CU_CP 1110, and the CU_UP 1112 of FIG. 11.

A first access link is established between the UE1 1204*a* and the first IAB node 1220*a*, and a second access link is established between the UE2 1204*b* and the second IAB node 1220*b*. A BH_RLCa channel is established between the DU1 1208*a* and the first IAB node 1220*a*, and a BH_RLCb channel is established between the DU2 1208*b* and the first IAB node 1220*a*. A BH_RLCc channel is established between the first IAB node 1220*a* and the second IAB node 1220*b*. The DU1 1208*a* and the DU2 1208*b* may respectively determine a BHRLC_PDBa for the BH_RLCa and a BHRLC_PDBb for the BH_RLCb.

The dotted line illustrates a UE1_DRB$_1$, referring to a DRB established between the UE1 and the DU1 1208*a*. That is, the UE1_DRB$_1$ may take the first access link and the BH_RLCa to the IAB donor 1207 DU1 1208*a*. Accordingly, the CU of the IAB donor 1207 may indicate a PDB1 and a CN_PDB1 to the first IAB node 1220*a*. The CU of the IAB donor 1207 may also indicate an F1U_PDB1 to the first IAB node 1220*a* so that the first IAB node 1220*a* may determine the access PDB$_1$ over the first access link. The first IAB node 1220*a* may determine the BHRLC_PDBc for the BH_RLCc.

The dashed-dotted line illustrates a UE1_DRB$_2$, referring to a DRB established between the UE1 and the DU2 1208*b*. That is, the UE1_DRB$_2$ may take the first access link and the BH_RLCb to the IAB donor 1207 DU2 1208*b*. Accordingly, the CU of the IAB donor 1207 may indicate a PDB2 and a CN_PDB2 to the first IAB node 1220*a*. The CU of the IAB donor 1207 may also indicate an F1U_PDB2 to the first IAB node 1220*a* so that the first IAB node 1220*a* may determine the access PDB$_2$ over the first access link.

The solid line illustrates a UE2_DRB, referring to a DRB established between the UE2 and the DU1 1208*a*. That is, the UE2_DRB may take the second access link, the BH_RLCc, and the BH_RLCa to the IAB donor 1207 DU1 1208*a*. Accordingly, the CU of the IAB donor 1207 may indicate a PDB3 and a CN_PDB3 to the second IAB node 1220*b*. The CU of the IAB donor 1207 may also indicate an F1U_PDB3 to the second IAB node 1220*b* so that the second IAB node 1220*b* may determine the access PDB3 over the second access link.

Accordingly, the CU of the IAB donor 1207 may indicate the F1U_PDB1 between the CU_UP1 1212*a* and the UE of the first IAB node 1220*a*, F1U_PDB2 between the CU_UP2 1212*b* and the UE of the first IAB node 1220*a*, and F1U_PDB3 between the CU_UP1 1212*a* and the UE of the second IAB node 1220*b*, or the components thereof to the first IAB node 1220*a* and the second IAB node 1220*b*, and the first IAB node 1220*a* and the second IAB node 1220*b* may determine the access PDB$_1$ and the access PDB$_2$ for the UE1 1204*a* over the first access link and the access PDB$_3$ for the UE 2 1204*b* over the second access link.

Figure 13:
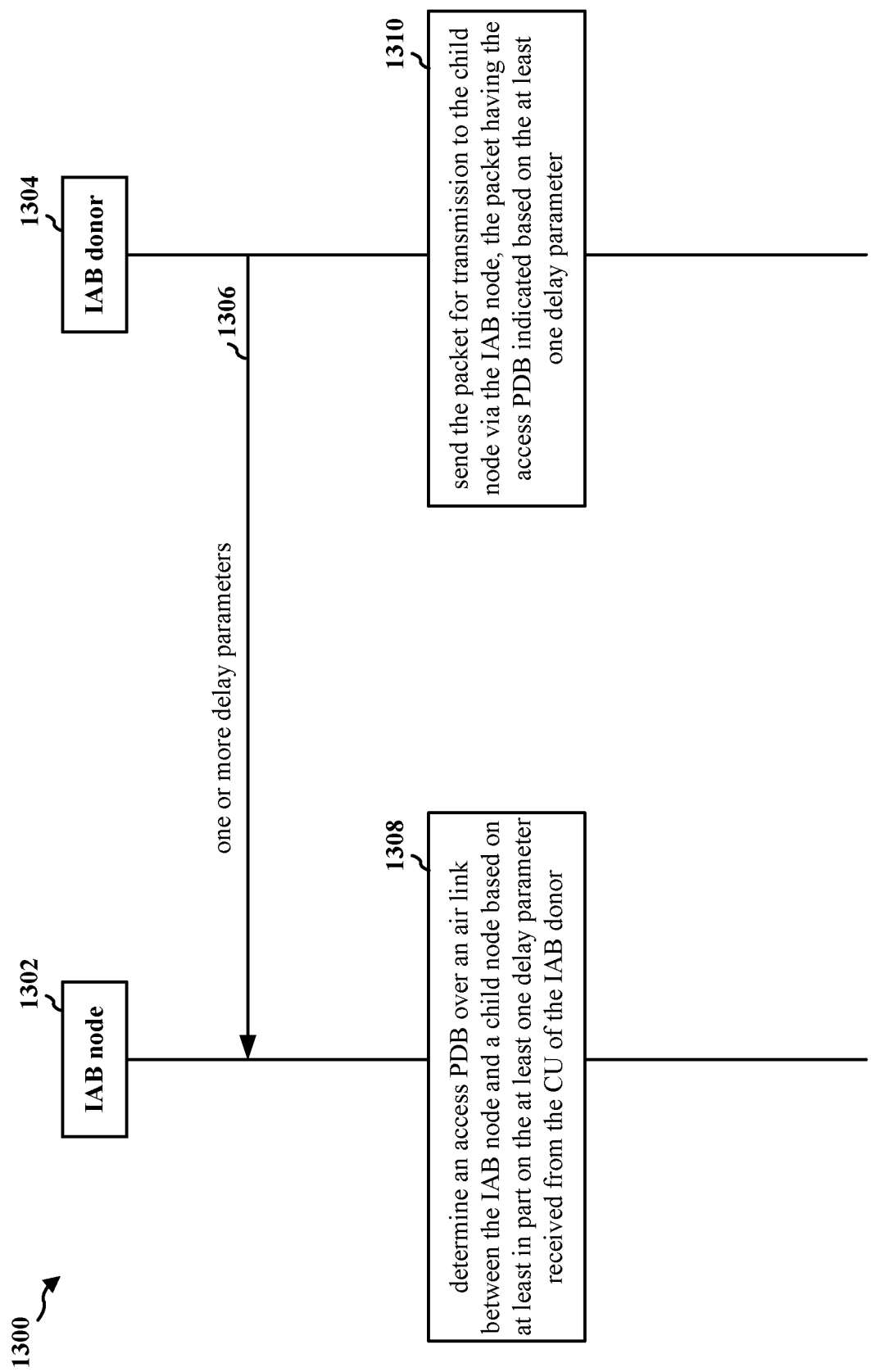
FIG. 13 is a call-flow chart of a method of wireless communication.

FIG. 13 is a call-flow diagram 1300 of a method of wireless communication. The call-flow diagram 1300 may include an IAB node 1302 and an IAB donor 1304. the IAB node 1302 to receive delay parameters from an IAB donor 1304 of the IAB network and determine an access PDB over an air link between the IAB node 1302 and a child node (or a UE) based in part on the delay parameters received from the IAB donor 1304. The IAB donor 1304 may include a CU, and the CU may provide parameters that enable an IAB node 1302 to perform a scheduling function and a discarding function in a way that makes efficient use of wireless resources without discarding packets that may be received by a UE within a PDB.

At 1306, the IAB donor 1304 of the IAB network may indicate at least one delay parameter to an IAB node 1302 for determination of an access PDB over an air link between the IAB node 1302 and a child node associated with a packet. The IAB node 1302 may receive at least one delay parameter from the CU of the IAB donor 1304 of the IAB network. At least one delay parameter may include the access PDB between a DU of the IAB node 1302 and the child node.

In some aspects, the one or more delay parameters from the IAB donor 1304 may include the access PDB between a DU of the IAB node 1302 and the child node, an F1U PDB between a CU of the IAB donor 1304 and the DU of the IAB node 1302, an F1U_PDB' between the CU of the IAB donor

1304 and an MT of the IAB node 1302, or a BAPRouting_PDB between the DU of the IAB donor 1304 and the DU of the IAB node 1302.

At least one delay parameter may be received per IAB node 1302. At least one delay parameter received from the CU of the IAB donor 1304 of the IAB network may represent the worst latency over all possible BAP routing paths via BAP routing paths established between the IAB donor 1304 and the IAB node 1302.

At least one delay parameter may be received per BAP routing paths established between the IAB node 1302 and the IAB donor 1304, where the access PDB may be determined per BAP routing paths.

At least one delay parameter may be received per DRB of the child node. In one aspect, at least one delay parameter may be provided to the IAB node 1302. In another aspect, the IAB node 1302 may determine at least one delay parameter based on another parameter received in an F1-AP signaling. The another parameter may include a seventh PDB between a UPF at an N6 interface and the CU of the IAB donor 1304, and the seventh PDB may be interpreted as a PDB between the UPF at an N6 interference and a DU of the IAB node 1302.

At least one delay parameter may be received per GTP-U between the IAB node 1302 and a CU-UP of the IAB donor 1304. At least one delay parameter may include the access PDB per DRB or per general packet radio service GTP-U of the DRB. At least one delay parameter may be carried by one of a non-child node associated F1-AP signaling or a child node associated F1-AP signaling.

At 1308, the IAB node 1302 may determine an access PDB over an air link between the IAB node 1302 and a child node based at least in part on the at least one delay parameter received from the CU of the IAB donor 1304. In one aspect, the access PDB may be determined by subtracting a second PDB between the CU of the IAB donor 1304 and a DU of the IAB node 1302 from a first PDB between the CU of the IAB donor 1304 and the child node, where the at least one delay parameter may include the second PDB. In another aspect, the access PDB may be determined by subtracting a third PDB between the CU of the IAB donor 1304 and an MT of the IAB node 1302 and a fourth PDB between the MT and a DU of the IAB node 1302 from a first PDB between the CU of the IAB donor 1304 and the child node, where the at least one delay parameter may include the third PDB. In another aspect, the access PDB may be determined by subtracting a fifth PDB between a DU of the IAB donor 1304 and the DU of the IAB node 1302 and a sixth PDB between the CU of the IAB donor 1304 and the DU of the IAB donor 1304 from a first PDB between the CU of the IAB donor 1304 and the child node, where the at least one delay parameter may include the fifth PDB.

At 1310, the IAB donor 1304 may send the packet for transmission to the child node via the IAB node 1302, the packet having the access PDB indicated based on at least one delay parameter. In one aspect, at least one delay parameter may include a second PDB between the CU of the IAB donor 1304 and a DU of the IAB node 1302, where the access PDB may be determined by subtracting the second PDB from a first PDB between the CU of the IAB donor 1304 and the child node. In another aspect, at least one delay parameter may include a third PDB between the CU of the IAB donor 1304 and an MT of the IAB node 1302, where the access PDB may be determined by subtracting the third PDB and a fourth PDB between the MT and a DU of the IAB node 1302 from a first PDB between the CU of the IAB donor 1304 and the child node. In another aspect, at least one delay parameter may include a fifth PDB between a DU of the IAB donor 1304 and the DU of the IAB node 1302, where the access PDB may be determined by subtracting the fifth PDB and a sixth PDB between the CU of the IAB donor 1304 and the DU of the IAB donor 1304 from a first PDB between the CU of the IAB donor 1304 and the child node.

Figure 14:
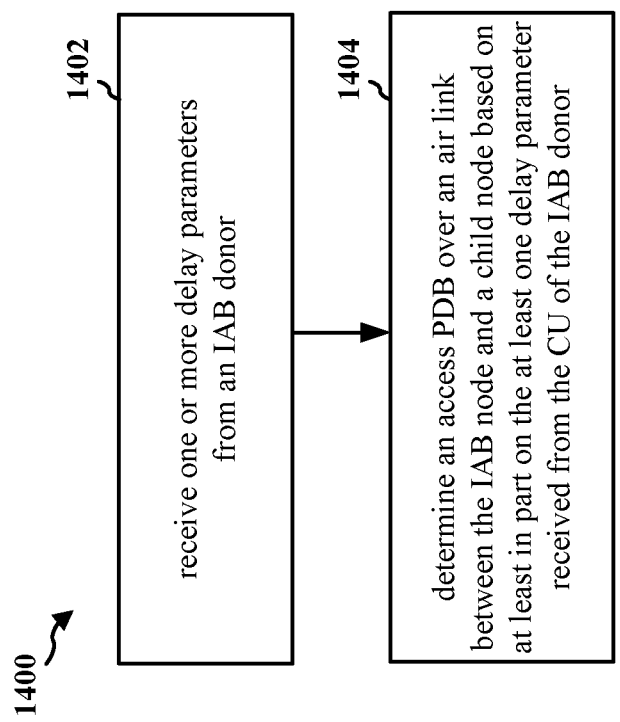
FIG. 14 is a flowchart of a method of wireless communication.

FIG. 14 is a flowchart 1400 of a method of wireless communication. The method may be performed by an IAB node or a component of an IAB node (e.g., the IAB node 103, 420, 520a, 520b, 606, 616, 618, 804, 806, 1120, 1122, 1124, 1126, 1220a, or 1220b; wireless device 310 or 350; the apparatus 1502). The method enables the IAB node to receive delay parameters from an IAB donor of the IAB network and determine an access PDB over an air link between the IAB node and a child node (or a UE) based in part on the delay parameters received from the IAB donor.

At 1402, the IAB node may receive at least one delay parameter from the CU of the IAB donor of the IAB network. In some aspects, the one or more delay parameters from the IAB donor may include the access PDB between a DU of the IAB node and the child node, an F1U_PDB between a CU of the IAB donor and the DU of the IAB node, an F1U_PDB' between the CU of the IAB donor and an MT of the IAB node, or a BAPRouting_PDB between the DU of the IAB donor and the DU of the IAB node. The one or more delay parameters may be received per IAB node and may represent the worst latency over all possible BAP routing paths via BAP routing paths established between the IAB donor and the IAB node. The one or more delay parameters may be received per BAP routing paths established between the IAB node and the IAB donor. One or more delay parameters may be received per DRB of the child node, and one or more delay parameters may be provided to the IAB node. The one or more delay parameters may be received per GTP-U between the IAB node and a CU-UP of the IAB donor. The one or more delay parameters may include the access PDB per DRB or per the GTP-U of the DRB. The one or more delay parameters may be carried by one of a non-child node associated F1-AP signaling or a child node associated F1-AP signaling. For example, at 1306, the IAB node 1302 may receive at least one delay parameter from the CU of the IAB donor 1304 of the IAB network. Furthermore, 1402 may be performed by a delay parameter component 1540.

At 1404, the IAB node may determine an access PDB over an air link between the IAB node and a child node based on at least in part on the at least one delay parameter received from the CU of the IAB donor. In one aspect, the access PDB may be determined by subtracting the F1U_PDB from a (PDB-CN_PDB) between the CU of the IAB donor and the child node. In another aspect, the access PDB may be determined by subtracting the F1U_PDB' and a proc_PDB between the MT and a DU of the IAB node from the (PDB-CN_PDB). In another aspect, the access PDB may be determined by subtracting the BAPRouting_PDB and a donor_PDB between the CU of the IAB donor and the DU of the IAB donor from the (PDB-CN_PDB). In another aspect, the access PDB may be determined per BAP routing paths. The IAB node may determine the one or more delay parameters based on another parameter received in an F1-AP signaling and may determine that the access PDB may be the (PDB-CN_PDB). For example, at 1308, the IAB node 1302 may determine an access PDB over an air link between the IAB node 1302 and a child node based on at least in part on the at least one delay parameter received from the CU of the IAB donor 1304. Furthermore, 1404 may be performed by a PDB component 1542.

Figure 15:
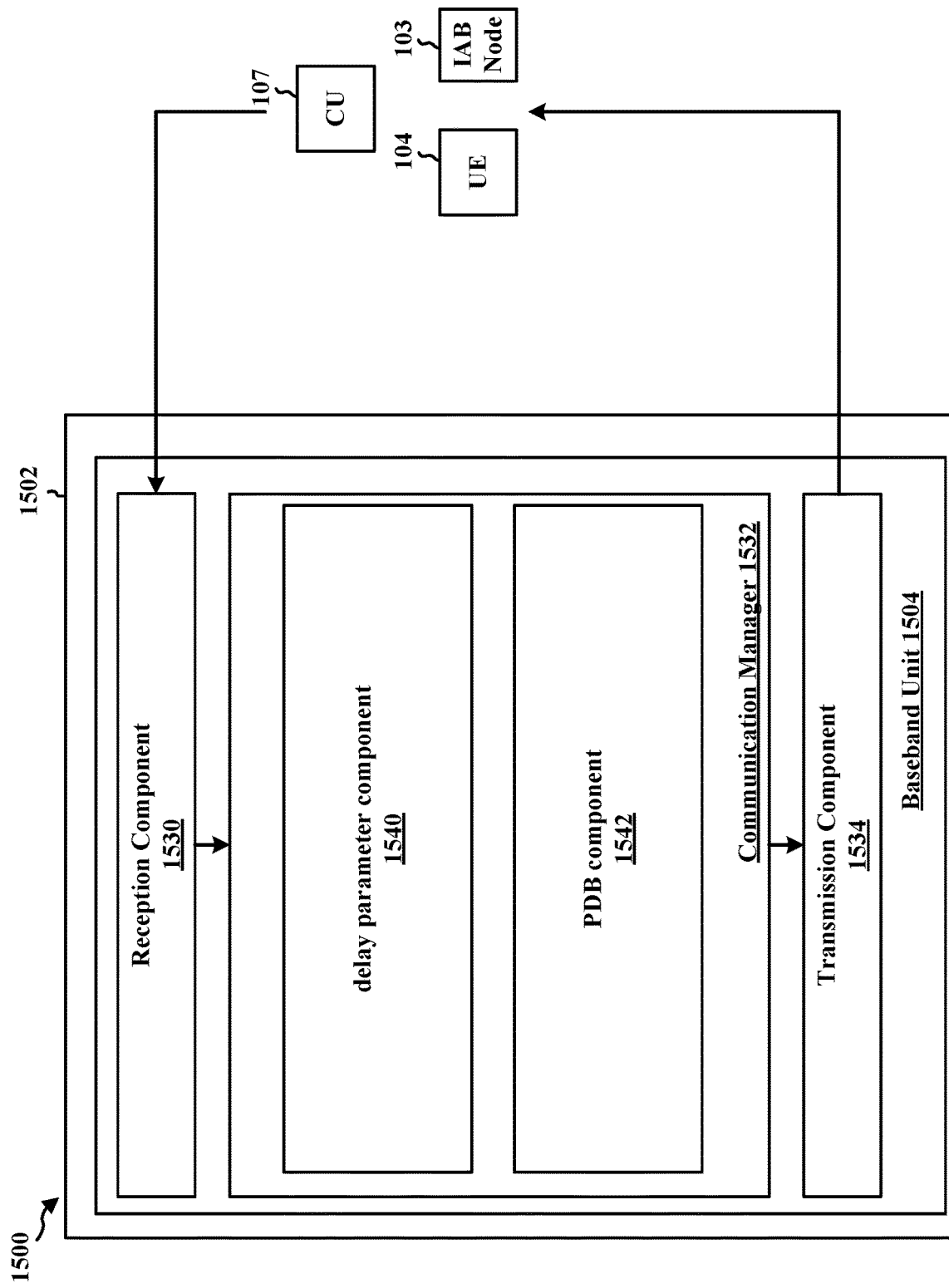
FIG. 15 is a diagram illustrating an example of a hardware implementation for an example apparatus.

FIG. 15 is a diagram 1500 illustrating an example of a hardware implementation for an apparatus 1502. The apparatus 1502 may be an IAB node and may include a baseband unit 1504. The baseband unit 1504 may communicate through a cellular RF transceiver with the UE 104; another IAB node 103, whether a parent node or a child node; and CU 107 of a donor IAB node. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further may include a reception component 1530, a communication manager 1532, and a transmission component 1534. The communication manager 1532 may include the one or more illustrated components. The components within the communication manager 1532 may be stored in the computer-readable medium/memory and/or configured as hardware within the baseband unit 1504. The baseband unit 1504 may be a component of the device 310 and may include the memory 376 and/or at least one of the TX processor 316, the RX processor 370, and the controller/processor 375.

The communication manager 1532 may include a delay parameter component 1540 that is configured to receive one or more delay parameters from an IAB donor, e.g., as described in connection with 1402. The communication manager 1532 may further include a PDB component 1542 that is configured to determine an access PDB over an air link between the IAB node and a child node or a UE based in part on the one or more delay parameters received from the IAB donor, e.g., as described in connection with 1404. The reception component 1530 may be configured to receive the first delay parameter and the second delay parameter, e.g., as described in connection with 1402.

The apparatus may include additional components that perform each of the blocks of the algorithm in the aforementioned flowchart of FIGS. 13 and 14. As such, each block in the aforementioned flowchart of FIGS. 13 and 14 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for receiving at least one delay parameter from a CU of an IAB donor of the IAB network and means for determining an access PDB over an air link between the IAB node and a child node based on at least in part on the at least one delay parameter received from the CU of the IAB donor. The aforementioned means may be one or more of the aforementioned components of the apparatus 1502 configured to perform the functions recited by the aforementioned means. As described supra, the apparatus 1502 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 16:
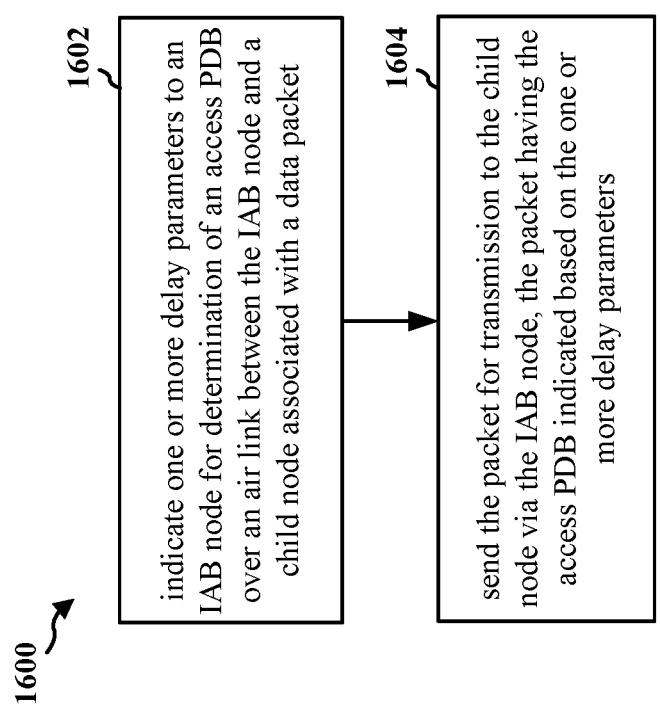
FIG. 16 is a flowchart of a method of wireless communication.

FIG. 16 is a flowchart 1600 of a method of wireless communication. The method may be performed by an IAB node CU (e.g., the CU 107, 602, 702; IAB donor 410, 510, 810, 1107 or 1207; wireless device 310 or 350; the apparatus 1702). The method enables a CU to provide parameters that enable an IAB node to perform a scheduling function and a discarding function in a way that makes efficient use of wireless resources without discarding packets that may be received by a UE within a PDB.

At 1602, the CU of the IAB donor may indicate one or more delay parameters to an IAB node for the determination of an access PDB over an air link between the IAB node and a child node (or a UE) associated with a data packet. In some aspects, the one or more delay parameters to the IAB node may include the access PDB between a DU of the IAB node and the child node, an F1U_PDB between a CU of the IAB donor and the DU of the IAB node, an F1U_PDB' between the CU of the IAB donor and an MT of the IAB node, or a BAPRouting_PDB between the DU of the IAB donor and the DU of the IAB node. The one or more delay parameters may be indicated per IAB node and may represent the worst latency over all possible BAP routing paths via BAP routing paths established between the IAB donor and the IAB node. The one or more delay parameters may be indicated per BAP routing paths established between the IAB node and the IAB donor. The one or more delay parameters may be indicated per DRB of the child node, and the one or more delay parameters may be provided to the IAB node. The one or more delay parameters may be indicated per GTP-U between the IAB node and a CU-UP of the IAB donor. The one or more delay parameters may include the access PDB per DRB or per the GTP-U of the DRB. The one or more delay parameters may be carried by one of a non-child node associated F1-AP signaling or a child node associated F1-AP signaling. For example, at 1306, the IAB donor 1304 of the IAB network may indicate at least one delay parameter to an IAB node 1302 for determination of an access PDB over an air link between the IAB node 1302 and a child node associated with a packet. Furthermore, 1602 may be performed by a delay parameter component 1740.

At 1604, the CU of the IAB donor may send the packet for transmission to the child node via the IAB node, the packet having the access PDB indicated based on at least one delay parameter. In one aspect, at least one delay parameter may include a second PDB between the CU of the IAB donor and a DU of the IAB node, where the access PDB may be determined by subtracting the second PDB from a first PDB between the CU of the IAB donor and the child node. In another aspect, at least one delay parameter may include a third PDB between the CU of the IAB donor and an MT of the IAB node, where the access PDB may be determined by subtracting the third PDB and a fourth PDB between the MT and a DU of the IAB node from a first PDB between the CU of the IAB donor and the child node. In another aspect, at least one delay parameter may include a fifth PDB between a DU of the IAB donor 1304 and the DU of the IAB node, where the access PDB may be determined by subtracting the fifth PDB and a sixth PDB between the CU of the IAB donor and the DU of the IAB donor from a first PDB between the CU of the IAB donor and the child node. For example, at 1310, the IAB donor 1304 may send the packet for transmission to the child node via the IAB node 1302, the packet having the access PDB indicated based on at least one delay parameter. Furthermore, 1604 may be performed by a data packet management component 1742.

Figure 17:
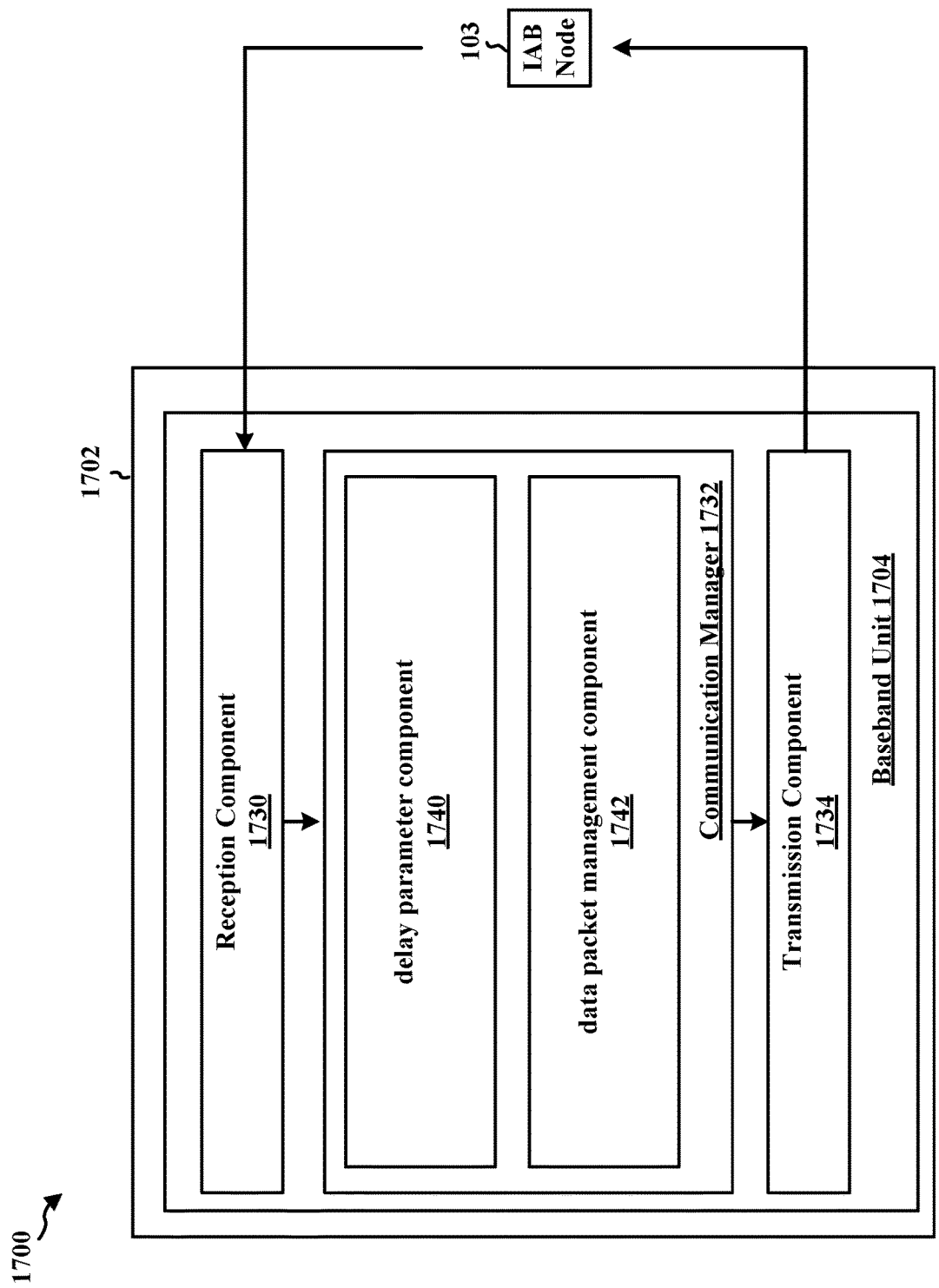
FIG. 17 is a diagram illustrating an example of a hardware implementation for an example apparatus.

FIG. 17 is a diagram 1700 illustrating an example of a hardware implementation for an apparatus 1702. The apparatus 1702 is a CU or a donor IAB node and includes a baseband unit 1704. The baseband unit 1704 may communicate through a cellular RF transceiver with one or more IAB nodes 103. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the device 310 and may include the memory 376 and/or at least one of the TX processor 316, the RX processor 370, and the controller/processor 375.

The communication manager 1732 includes a delay parameter component 1740 that is configured to indicate one or more delay parameters to an IAB node for determination of an access PDB over an air link between the IAB node and a child node (or a UE) associated with a data packet, e.g., as described in connection with 1602. The communication manager 1732 further includes a data packet management component 1742 that is configured to send the packet for transmission to the child node via the IAB node, the packet having the access PDB indicated based on the one or more delay parameters, e.g., as described in connection with 1604. The transmission component 1734 sends the packet for transmission to a UE via one or more IAB nodes including the IAB node, e.g., as described in connection with 1604.

The apparatus may include additional components that perform each of the blocks of the algorithm in the aforementioned flowchart of FIGS. 13 and 16. As such, each block in the aforementioned flowchart of FIGS. 13 and 16 may be performed by a component, and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the baseband unit 1704, includes means for indicating at least one delay parameter to an IAB node for determination of an access PDB over an air link between the IAB node and a child node associated with a packet, and means for sending the packet for transmission to the child node via the IAB node, the packet having the access PDB indicated based on the at least one delay parameter. The aforementioned means may be one or more of the aforementioned components of the apparatus 1702 configured to perform the functions recited by the aforementioned means. As described supra, the apparatus 1702 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

An JAB node may receive one or more delay parameters from an IAB donor and determine an access PDB over an air link between the JAB node and a child node (or a UE) based in part on the one or more delay parameters received from the IAB donor. The one or more delay parameters may include the access PDB between a DU of the IAB node and the child node, an F1U_PDB between a CU of the IAB donor and the DU of the IAB node, an F1U_PDB' between the CU of the IAB donor and an MT of the IAB node, or a BAPRouting_PDB between the DU of the IAB donor and the DU of the IAB node. The access PDB may be determined by subtracting the F1U_PDB from a (PDB-CN_PDB) between the CU of the IAB donor and the child node. The access PDB may be determined by subtracting the F1U_PDB' and a proc_PDB between the MT and a DU of the IAB node from the (PDB-CN_PDB). The access PDB may be determined by subtracting the BAPRouting_PDB and a donor_PDB between the CU of the IAB donor and the DU of the IAB donor from the (PDB-CN_PDB).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive at least one delay parameter from a CU of an IAB donor of the IAB network, and determine an access PDB over an air link between the IAB node and a child node based on at least in part on the at least one delay parameter received from the CU of the IAB donor.

Aspect 2 is the apparatus of aspect 1, further including a transceiver coupled to the at least one processor, where the at least one delay parameter includes the access PDB between a DU of the IAB node and the child node.

Aspect 3 is the apparatus of any of aspects 1 and 2, where the access PDB is determined by subtracting a second PDB between the CU of the IAB donor and a DU of the IAB node from a first PDB between the CU of the IAB donor and the child node, and the at least one delay parameter includes the second PDB.

Aspect 4 is the apparatus of any of aspects 1 to 3, where the access PDB is determined by subtracting a third PDB between the CU of the IAB donor and an MT of the IAB node and a fourth PDB between the MT and a DU of the IAB node from a first PDB between the CU of the IAB donor and the child node, and the at least one delay parameter includes the third PDB.

Aspect 5 is the apparatus of any of aspects 1 to 4, where the access PDB is determined by subtracting a fifth PDB between a DU of the IAB donor and the DU of the IAB node and a sixth PDB between the CU of the IAB donor and the DU of the IAB donor from a first PDB between the CU of the IAB donor and the child node, and the at least one delay parameter includes the fifth PDB.

Aspect 6 is the apparatus of any of aspects 1 to 5, where the at least one delay parameter is received per IAB node.

Aspect 7 is the apparatus of aspect 6, where the at least one delay parameter received from the CU of the IAB donor of the IAB network represents the worst latency over all possible BAP routing paths via BAP routing paths established between the IAB donor and the IAB node.

Aspect 8 is the apparatus of any of aspects 1 to 7, where the at least one delay parameter is received per BAP routing paths established between the IAB node and the IAB donor, and the access PDB may be determined per BAP routing paths.

Aspect 9 is the apparatus of any of aspects 1 to 8, where the at least one delay parameter is received per DRB of the child node.

Aspect 10 is the apparatus of aspect 9, where the at least one delay parameter is provided to the IAB node.

Aspect 11 is the apparatus of aspect 9, where the IAB node determines the at least one delay parameter based on another parameter received in an F1-AP signaling.

Aspect 12 is the apparatus of aspect 11, where the another parameter includes a seventh PDB between a UPF at an N6 interface and the CU of the IAB donor, and the seventh PDB is interpreted as a PDB between the UPF at an N6 interference and a DU of the IAB node.

Aspect 13 is the apparatus of any of aspects 1 to 12, where the at least one delay parameter is received per GTP-U between the IAB node and a CU-UP of the IAB donor.

Aspect 14 is the apparatus of any of aspects 1 to 13, where the at least one delay parameter includes the access PDB per DRB or per general packet radio service GTP-U of the DRB.

Aspect 15 is the apparatus of any of aspects 1 to 14, where the at least one delay parameter is carried by one of a non-child node associated F1-AP signaling or a child node associated F1-AP signaling.

Aspect 16 is a method of wireless communication for implementing any of aspects 1 to 15.

Aspect 17 is an apparatus for wireless communication including means for implementing any of aspects 1 to 15.

Aspect 18 is a computer-readable medium storing computer executable code, where the code when executed by a processor causes the processor to implement any of aspects 1 to 15.

Aspect 19 is an apparatus for wireless communication including at least one processor coupled to a memory and configured to indicate at least one delay parameter to an IAB node for determination of an access PDB over an air link between the IAB node and a child node associated with a packet, and send the packet for transmission to the child node via the IAB node, the packet having the access PDB indicated based on the at least one delay parameter.

Aspect 20 is the apparatus of aspect 19, where the at least one delay parameter includes the access PDB between a DU of the IAB node and the child node.

Aspect 21 is the apparatus of any of aspects 19 and 20, where the at least one delay parameter includes a second PDB between the CU of the IAB donor and a DU of the IAB node, and the access PDB is determined by subtracting the second PDB from a first PDB between the CU of the IAB donor and the child node.

Aspect 22 is the apparatus of any of aspects 19 to 21, where the at least one delay parameter includes a third PDB between the CU of the IAB donor and an MT of the IAB node, and the access PDB is determined by subtracting the third PDB and a fourth PDB between the MT and a DU of the IAB node from a first PDB between the CU of the IAB donor and the child node.

Aspect 23 is the apparatus of any of aspects 19 to 22, where the at least one delay parameter includes a fifth PDB between a DU of the IAB donor and the DU of the IAB node, and the access PDB is determined by subtracting the fifth PDB and a sixth PDB between the CU of the IAB donor and the DU of the IAB donor from a first PDB between the CU of the IAB donor and the child node.

Aspect 24 is the apparatus of any of aspects 19 to 23, where the at least one delay parameter is indicated per IAB node.

Aspect 25 is the apparatus of aspect 24, where the at least one delay parameter indicated to the IAB node represents the worst latency over all possible BAP routing paths via BAP routing paths established between the IAB donor and the IAB node.

Aspect 26 is the apparatus of any of aspects 19 to 25, where the at least one delay parameter is indicated to the IAB node per BAP routing paths established between the IAB node and the IAB donor, and the access PDB may be determined per BAP routing paths.

Aspect 27 is the apparatus of any of aspects 19 to 26, where the at least one delay parameter is indicated per DRB of the child node.

Aspect 28 is the apparatus of aspect 27, where the at least one delay parameter is provided to the IAB node.

Aspect 29 is the apparatus of aspect 27, where the IAB node determines the at least one delay parameter based on another parameter indicated in an F1-AP signaling.

Aspect 30 is the apparatus of aspect 29, where the another parameter includes a seventh PDB between an UPF at an N6 interface and the CU of the IAB donor, and the seventh PDB is interpreted as a PDB between the UPF at an N6 interference and a DU of the IAB node.

Aspect 31 is the apparatus of any of aspects 19 to 30, where the at least one delay parameter is indicated per GTP-U between the IAB node and a CU-UP of the IAB donor.

Aspect 32 is the apparatus of any of aspects 19 to 31, where the at least one delay parameter includes the access PDB per DRB or per general packet radio service GTP-U of the DRB.

Aspect 33 is the apparatus of any of aspects 19 to 32, where the at least one delay parameter is carried by one of a non-child node associated F1-AP signaling or a child node associated F1-AP signaling.

Aspect 34 is a method of wireless communication for implementing any of aspects 19 to 33.

Aspect 35 is an apparatus for wireless communication including means for implementing any of aspects 19 to 33.

Aspect 36 is a computer-readable medium storing computer executable code, where the code when executed by a processor causes the processor to implement any of aspects 19 to 33.

What is claimed is:

1. An apparatus for wireless communication at an Integrated Access and Backhaul (IAB) node of an IAB network, comprising:
   memory; and
   at least one processor coupled to the memory, the at least one processor and the memory configured to:
      receive at least one delay parameter from a central unit (CU) of an IAB donor of the IAB network, wherein the at least one delay parameter is indicated by the CU of the IAB donor to the IAB node via an F1 application protocol (AP) (F1-AP) message, and wherein the at least one delay parameter is configured for the IAB node; and
      determine an access packet delay budget (PDB) over an air link between the IAB node and a user equipment based on at least in part on the at least one delay parameter received from the CU of the IAB donor, wherein to determine the access PDB, the at least one processor is configured to determine the access PDB by subtracting a first PDB between the CU of the IAB donor and a mobile termination (MT) of the IAB node or between a distributed unit (DU) of the IAB donor and the DU of the IAB node, and a second PDB between the MT and a distributed unit (DU) of the IAB node or between the CU of the IAB donor and the DU of the IAB donor, from a third PDB between the CU of the IAB donor and the user equipment, wherein the at least one delay parameter includes the first PDB.

2. The apparatus of claim 1, further comprising a transceiver coupled to the at least one processor, wherein the at least one delay parameter includes the access PDB between a distributed unit (DU) of the IAB node and the user equipment.

3. The apparatus of claim 1, wherein to determine the access PDB, the at least one processor is configured to determine the access PDB by subtracting the first PDB between the CU of the IAB donor and the MT of the IAB node and the second PDB between the MT and the DU of the IAB node from the third PDB between the CU of the IAB donor and the user equipment,
   wherein the at least one delay parameter includes the first PDB.

4. The apparatus of claim 1, wherein to determine the access PDB, the at least one processor is configured to determine the access PDB by subtracting the first PDB between the of the IAB donor and the DU of the IAB node and the second PDB between the CU of the IAB donor and the DU of the IAB donor from the third PDB between the CU of the IAB donor and the user equipment,
   wherein the at least one delay parameter includes the first PDB.

5. The apparatus of claim 1, wherein to receive the at least one delay parameter, the at least one processor is configured to receive the at least one delay parameter per IAB node.

6. The apparatus of claim 5, wherein the at least one delay parameter received from the CU of the IAB donor of the IAB network represents a worst latency over all possible backhaul adaptation protocol (BAP) routing paths via BAP routing paths established between the IAB donor and the IAB node.

7. The apparatus of claim 1, wherein to receive the at least one delay parameter, the at least one processor is configured to receive the at least one delay parameter per backhaul adaptation protocol (BAP) routing paths established between the IAB node and the IAB donor,
   wherein to determine the access PDB, the at least one processor is configured to determine the access PDB per BAP routing paths.

8. The apparatus of claim 1, wherein to receive the at least one delay parameter, the at least one processor is configured to receive the at least one delay parameter per data radio bearer (DRB) of the user equipment.

9. The apparatus of claim 8, wherein the IAB node is configured to determine the at least one delay parameter based on another parameter received in an F1-AP signaling.

10. The apparatus of claim 9, wherein the another parameter comprises first PDB between a user plane function (UPF) at an N6 interface and the CU of the IAB donor,
    wherein the first PDB is interpreted as a second PDB between the UPF at an N6 interference and a distributed unit (DU) of the IAB node.

11. The apparatus of claim 1, wherein to receive the at least one delay parameter, the at least one processor is configured to receive the at least one delay parameter per general packet radio service (GPRS) tunneling Protocol (GTP) user plane (GTP-U) between the IAB node and a CU user plane (CU-UP) of the IAB donor.

12. The apparatus of claim 1, wherein the at least one delay parameter comprises the access PDB per data radio bearer (DRB) or per general packet radio service tunneling protocol user plane (GTP-U) of the DRB.

13. The apparatus of claim 1, wherein the F1-AP message is a non-user equipment (UE)-associated F1-AP message or a UE-associated F1-AP message.

14. A method of wireless communication at an Integrated Access and Backhaul (IAB) node of an IAB network, comprising:
    receiving at least one delay parameter from a central unit (CU) of an IAB donor of the IAB network, wherein the at least one delay parameter is indicated by the CU of the IAB donor to the IAB node via an F1 application protocol (AP) (F1-AP) message, and wherein the at least one delay parameter is configured for the IAB node; and determining an access packet delay budget (PDB) over an air link between the IAB node and a user equipment based on at least in part on the at least one delay parameter received from the CU of the IAB donor, wherein determining the access PDB comprises determining the access PDB by subtracting a first PDB between the CU of the IAB donor and a mobile termination (MT) of the IAB node or between a distributed unit (DU) of the IAB donor and the DU of the IAB node, and a second PDB between the MT and a distributed unit (DU) of the IAB node or between the CU of the IAB donor and the DU of the IAB donor, from a third PDB between the CU of the IAB donor and the user equipment, wherein the at least one delay parameter includes the first PDB.

15. A apparatus of wireless communication at a central unit (CU) of an Integrated Access and Backhaul (IAB) donor of an IAB network, comprising:

memory; and at least one processor coupled to the memory, the at least one processor and the memory configured to:

indicate at least one delay parameter to an IAB node for determination of an access packet delay budget (PDB) over an air link between the IAB node and a user equipment associated with a packet, wherein the at least one delay parameter is indicated by the CU of the IAB donor to the IAB node via an F1 application protocol (AP) (F1-AP) message, and wherein the at least one delay parameter is configured for the IAB node; and send the packet for transmission to the user equipment via the IAB node, the packet having the access PDB indicated based on the at least one delay parameter, wherein the access PDB is based on subtracting a first PDB between the CU of the IAB donor and a mobile termination (MT) of the IAB node or between a distributed unit (DU) of the IAB donor and the DU of the IAB node, and a second PDB between the MT and a distributed unit (DU) of the IAB node or between the CU of the IAB donor and the DU of the IAB donor, from a third PDB between the CU of the IAB donor and the user equipment, wherein the at least one delay parameter includes the first PDB.

16. The apparatus of claim 15, further including a transceiver coupled to the at least one processor, wherein the at least one delay parameter includes the access PDB between a distributed unit (DU) of the IAB node and the user equipment.

17. The apparatus of claim 15, wherein the at least one delay parameter includes the first PDB between the CU of the IAB donor and the MT of the IAB node, wherein the access PDB is configured to be based on subtracting the first PDB and the second PDB between the MT and the DU of the IAB node from the third PDB between the CU of the IAB donor and the user equipment.

18. The apparatus of claim 15, wherein the at least one delay parameter includes the first PDB between the DU of the IAB donor and the DU of the IAB node, wherein the access PDB is configured to be determined by subtracting the first PDB and the second PDB between the CU of the IAB donor and the DU of the IAB donor from the third PDB between the CU of the IAB donor and the user equipment.

19. The apparatus of claim 15, wherein to indicate the at least one delay parameter, the at least one processor is configured to indicate the at least one delay parameter per the IAB node.

20. The apparatus of claim 19, wherein the at least one delay parameter indicated to the IAB node represents a worst latency over all possible backhaul adaptation protocol (BAP) routing paths via BAP routing paths established between the IAB donor and the IAB node.

21. The apparatus of claim 15, wherein to indicate the at least one delay parameter, the at least one processor is configured to indicate the at least one delay parameter to the IAB node per backhaul adaptation protocol (BAP) routing paths established between the IAB node and the IAB donor, wherein the access PDB is configured to be determined per BAP routing paths.

22. The apparatus of claim 15, wherein to indicate the at least one delay parameter, the at least one processor is configured to indicate the at least one delay parameter per data radio bearer (DRB) of the user equipment.

23. The apparatus of claim 22, wherein the IAB node is configured to determine the at least one delay parameter based on another parameter indicated in an F1-AP signaling.

24. The apparatus of claim 15, wherein to indicate the at least one delay parameter, the at least one processor is configured to indicate the at least one delay parameter per general packet radio service (GPRS) tunneling protocol (GTP) user plane (GTP-U) between the IAB node and a CU user plane (CU-UP) of the IAB donor.

25. The apparatus of claim 15, wherein the at least one delay parameter comprises the access PDB per data radio bearer (DRB) or per general packet radio service tunneling protocol user plane (GTP-U) of the DRB.

26. The apparatus of claim 15, wherein the F1-AP message is a non-user equipment (UE)-associated F1-AP message or a UE-associated F1-AP message.

27. A method of wireless communication at a central unit (CU) of an Integrated Access and Backhaul (IAB) donor of an IAB network, comprising:

indicating at least one delay parameter to an IAB node for determination of an access packet delay budget (PDB) over an air link between the IAB node and a user equipment associated with a packet, wherein the at least one delay parameter is indicated by the CU of the IAB donor to the IAB node via an F1 application protocol (AP) (F1-AP) message, and wherein the at least one delay parameter is configured for the IAB node; and sending the packet for transmission to the user equipment via the IAB node, the packet having the access PDB indicated based on the at least one delay parameter, wherein the access PDB is based on subtracting a first PDB between the CU of the IAB donor and a mobile termination (MT) of the IAB node or between a distributed unit (DU) of the IAB donor and the DU of the IAB node, and a second PDB between the MT and a distributed unit (DU) of the IAB node or between the CU of the IAB donor and the DU of the IAB donor, from a third PDB between the CU of the IAB donor and the user equipment, wherein the at least one delay parameter includes the first PDB.

* * * * *